US011946598B2

(12) United States Patent
Dessau et al.

(10) Patent No.: US 11,946,598 B2
(45) Date of Patent: Apr. 2, 2024

(54) CRYOGENICALLY COOLED VACUUM CHAMBER RADIATION SHIELDS FOR ULTRA-LOW TEMPERATURE EXPERIMENTS AND EXTREME HIGH VACUUM (XHV) CONDITIONS

(71) Applicant: The Regents of the University of Colorado, a body corporate, Denver, CO (US)

(72) Inventors: Daniel Dessau, Boulder, CO (US); Justin Griffith, Morrison, CO (US)

(73) Assignee: The Regents of of the University of Colorado, a body corporate, Denver, CO (US)

( * ) Notice: Subject to any disclaimer, the term of this patent is extended or adjusted under 35 U.S.C. 154(b) by 588 days.

(21) Appl. No.: 17/274,881

(22) PCT Filed: Sep. 12, 2019

(86) PCT No.: PCT/US2019/050871
§ 371 (c)(1),
(2) Date: Mar. 10, 2021

(87) PCT Pub. No.: WO2020/056177
PCT Pub. Date: Mar. 19, 2020

(65) Prior Publication Data

US 2022/0057046 A1 Feb. 24, 2022

Related U.S. Application Data

(60) Provisional application No. 62/838,999, filed on Apr. 26, 2019, provisional application No. 62/730,233, filed on Sep. 12, 2018.

(51) Int. Cl.
*F25B 9/14* (2006.01)
*F17C 3/08* (2006.01)
(Continued)

(52) U.S. Cl.
CPC ................ *F17C 3/085* (2013.01); *F25B 9/10* (2013.01); *F25B 9/14* (2013.01); *F25D 19/00* (2013.01);
(Continued)

(58) Field of Classification Search
CPC .. F25B 9/10; F25B 9/14; F25D 19/006; F17C 3/085
See application file for complete search history.

(56) References Cited

U.S. PATENT DOCUMENTS 4,765,153 A 8/1988 Wachi
5,339,650 A 8/1994 Hakamada
(Continued)

FOREIGN PATENT DOCUMENTS

CN 101498525 A 8/2009
CN 104335063 A 2/2015
(Continued)

OTHER PUBLICATIONS

DE3406859C1 Translation.*
(Continued)

*Primary Examiner* — Brian M King
(74) *Attorney, Agent, or Firm* — Neugeboren O'Dowd PC

(57) ABSTRACT

Methods, systems, and devices for ultra or extreme-high vacuum are described. Such systems may comprise a vacuum chamber, a target within the vacuum chamber, two or more overlapping radiation shields arranged within an inner vacuum space of a vacuum chamber, and surrounding at least a portion of the target, a first and a second cooling element unit thermally coupled to a first and second radiation shield of the two or more overlapping radiation shields, wherein the first unit is configured to reduce the first radiation shield's temperature to at least <100K, and the second unit is configured to reduce the second radiation
(Continued)

shield's temperature to at least <25K, and a third cooling element unit coupled to the target and isolated from the first and second radiation shield, wherein the third cooling element unit is configured to reduce the target's temperature to at least <4K.

19 Claims, 28 Drawing Sheets

(51) Int. Cl.
*F25B 9/10* (2006.01)
*F25D 19/00* (2006.01)
(52) U.S. Cl.
CPC ................. *F17C 2203/0316* (2013.01); *F17C 2203/0629* (2013.01); *F17C 2223/0161* (2013.01)

(56) References Cited

U.S. PATENT DOCUMENTS

| | | | | |
|---|---|---|---|---|
| 5,442,928 | A * | 8/1995 | Laskaris | H01F 6/065 62/51.1 |
| 6,990,818 | B2 | 1/2006 | Hofmann | |
| 9,212,782 | B2 | 12/2015 | Clayton et al. | |
| 2003/0106326 | A1* | 6/2003 | Sekimoto | F17C 3/085 62/51.1 |
| 2004/0170414 | A1 | 9/2004 | Kuebler et al. | |
| 2005/0229609 | A1 | 10/2005 | Kirichek et al. | |
| 2010/0162731 | A1 | 7/2010 | Noonan | |
| 2010/0219832 | A1 | 9/2010 | Aarts | |
| 2014/0202179 | A1* | 7/2014 | Batey | F25D 29/001 62/190 |
| 2014/0373558 | A1 | 12/2014 | Stutzman et al. | |
| 2015/0332830 | A1* | 11/2015 | Jiang | F25D 3/00 62/51.1 |
| 2020/0018524 | A1* | 1/2020 | Graf | F25B 9/10 |

FOREIGN PATENT DOCUMENTS

| | | | |
|---|---|---|---|
| DE | 3406859 | C1 | 4/1985 |
| DE | 4 039 365 | A1 | 6/1992 |
| DE | 4 310 138 | A1 | 9/1993 |
| DE | 6 902 8379 | T2 | 1/1997 |
| DE | 6 902 8046 | T2 | 3/1997 |
| EP | 0 377 740 | A1 | 7/1990 |
| EP | 0 403 880 | A2 | 12/1990 |
| EP | 0 433 002 | A2 | 6/1991 |
| GB | 2 265 449 | A | 9/1993 |
| GB | 2 318 176 | A | 4/1998 |
| JP | 61205382 | A | 9/1986 |
| JP | H05275231 | A | 10/1993 |
| JP | 2008051279 | A | 3/2008 |
| WO | 2001096020 | A1 | 12/2001 |

OTHER PUBLICATIONS

Extended European Search Report received for European Patent Application Serial No. 19860539.6 dated Feb. 2, 2022, 8 pages.

Vetrovec, J., "Calculating the Pumping Speeds of Cryopanels: Option to Monte Carlo Methods", "Fusion Technology", 1985, pp. 1235-1240, vol. 8, Publisher: Retrieved from https://ans.tandfonline.com/doi/10.13182/FST85-A39936#.YHh0aR1Ki71.

Baharlou, Simin, "International Preliminary Report on Patentability Regarding International Application No. PCT/US2019/050871", dated Mar. 9, 2021, p. 8, Published in: CH.

Thomas, Shane, "International Search Report and Written Opinion Regarding International Application No. PCT/US/2019/050871", dated Nov. 20, 2019, p. 9, Published in: US.

Scannapiego et al., "Experimental Investigation on Charcoal Adsorption for Cryogenic Pump Application", 2017, IOP Conf. Series: Materials Science and Engineering, vol. 278, p. 7, Publisher: IOP Publishing, Retrieved from https://www.researchgate.net/figure/a-Front-view-of-the-TIMO-open-panel-cryopump-mounted-on-its-flange-sketches-of-the-two_fig1_3221401.

Massiczek et al., "Liquid Helium-Free Cryostat and Hermetically Sealed Cryogenic Microwave Cavity for Hyperfine Spectroscopy of Antiprotonic Helium", 2011, Nucl Instrm Methods Phys Res A., vol. 659(1-3), p. 17, Publisher: Elsevier B.V., Retrieved from https://www.ncbi.nlm.nih.gov/pmc/articles/PMC3220765/.

Iwasa et al., "A New Type of Cryopump With a Metal Cryopanel Cooled Below 3.6 K by a Two-Stage GM Refrigerator", "Vacuum", 1996, pp. 675-678, vol. 47, No. 6-8, Publisher: Elsevier Science Ltd., Retrieved from https://www.sciencedirect.com/science/article/abs/pii/0042207X96000449, Published in: GB.

Balshaw, N. H., "Practical Cryogenics, an Introduction to Laboratory Cryogenics", 2001, p. 96, Publisher: Oxford Instruments Superconductivity Limited, Retrieved from http://research.physics.illinois.edu/bezryadin/links/practical%20Cryogenics.pdf.

Ross, Jr., Ronald, "Refrigerator Systems for Achieving Cryogenic Temperatures", "Chapter 6 of Low Temperature Materials and Mechanisms", 2016, p. 57, Publisher: CRC Press, Retrieved from https://www2.jpl.nasa.gov/adv_tech/coolers/Cool_ppr/Chap%206-Refrig%20Sys%20for%20Achiev%20Cryo%20Temps_2016.pdf.

Vac Aero International, "An Introduction to Vacuum Pumps", Jan. 13, 2016, p. 7, Publisher: Retrieved from https://vacaero.com/information-resources/vacuum-pump-technology-education-and-training/1039-an-introduction-to-vacuum-pumps.html.

Murdoch et al., "Vacuum Technology for ITER", "Journal of Physics", 2008, vol. 100, Publisher: IOP Publishing, Retrieved from https://www.researchgate.net/publication/231133252_Vacuum_technology_for_ITER.

First Office Action received for Chinese Patent Application Serial No. 201980074717.1 dated May 6, 2022, 16 pages.

Second Office Action received for Chinese Patent Application Serial No. 201980074717.1 dated Jan. 13, 2023, 10 pages.

Japan Patent Office, "Office Action Issued in Japanese Patent Application No. 2021-513776.", dated Aug. 29, 2023, p. 9, Published in: JP.

* cited by examiner

Cryogenic
(dual stage)
Time of Flight (TOF)
ARPES Analyzer

CRYOGENICALLY COOLED VACUUM CHAMBER RADIATION SHIELDS FOR ULTRA-LOW TEMPERATURE EXPERIMENTS AND EXTREME HIGH VACUUM (XHV) CONDITIONS

CLAIM OF PRIORITY UNDER 35 U.S.C. § 119

The present Application for Patent is a 371 Application of International Application No. PCT/US19/50871 entitled "CRYOGENICALLY COOLED VACUUM CHAMBER RADIATION SHIELDS FOR ULTRA-LOW TEMPERATURE EXPERIMENTS AND EXTREME HIGH VACUUM (XHV) CONDITIONS" filed Sep. 12, 2019 which claims priority to Provisional Application No. 62/730,233 entitled "CRYOGENICALLY COOLED VACUUM CHAMBER RADIATION SHIELDS FOR ULTRA-LOW TEMPERATURE EXPERIMENTS AND EXTREME HIGH VACUUM (XHV) CONDITIONS" filed Sep. 12, 2018, and Provisional Application No. 62/838,999 entitled "CRYOGENICALLY COOLED VACUUM CHAMBER RADIATION SHIELDS FOR ULTRA-LOW TEMPERATURE EXPERIMENTS AND EXTREME HIGH VACUUM (XHV) CONDITIONS" filed Apr. 26, 2019, both of which are assigned to the assignee hereof and hereby expressly incorporated by reference herein.

FIELD OF THE DISCLOSURE

The present disclosure relates generally to Ultra-Low Temperature and Ultra-High and Extreme-High Vacuum systems. In particular, but not by way of limitation, the present disclosure relates to systems, methods and apparatuses for a vacuum chamber using one or more cryogenically cooled radiation shields to reduce pressure within the chamber and/or to provide a cryogenic environment for low temperature experiments.

FIGURES DESCRIPTION

SUMMARY OF THE DISCLOSURE

Figure 1:
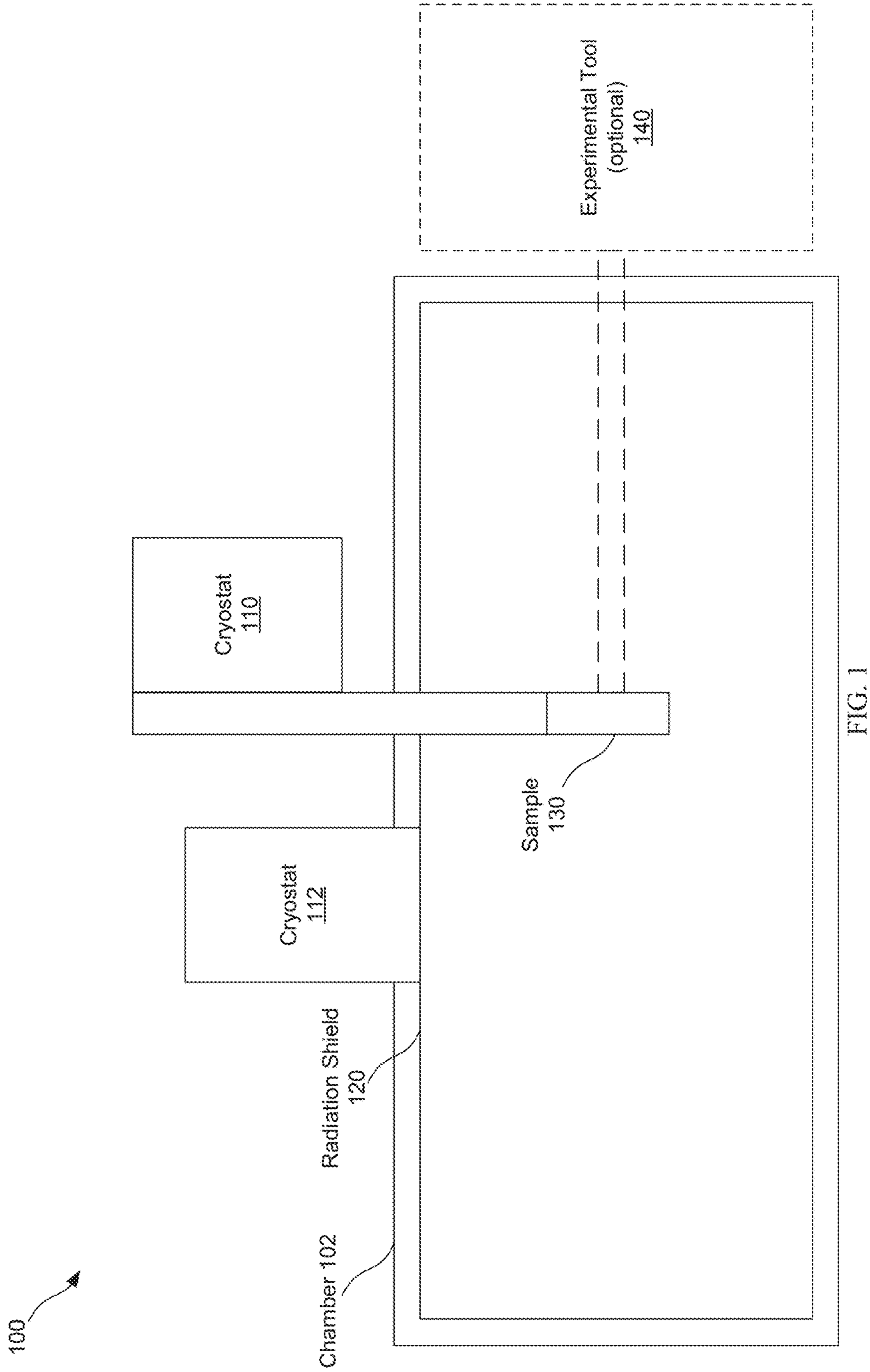
FIG. 1 illustrates an ultra-high or extreme-high vacuum system including a chamber, a radiation shield, a dedicated shield cryostat, a cryostat with target, and optionally an experimental tool.

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Some embodiments of the disclosure may be characterized as an ultra-high vacuum (UHV) or extreme-high vacuum (XHV) system comprising a vacuum chamber, a target within the vacuum chamber, two or more overlapping radiation shields arranged within an inner vacuum space of a vacuum chamber, wherein the two or more overlapping radiation shields surround at least a portion of the target, a first cooling element unit thermally coupled to a first radiation shield of the two or more overlapping radiation shields, wherein the first cooling element unit is configured to reduce the first radiation shield's temperature to at least <100K, a second cooling element unit thermally coupled to a second radiation shield of the two or more overlapping radiation shields, wherein the second cooling element unit is configured to reduce the second radiation shield's temperature to at least <25K, and a third cooling element unit thermally coupled to the target, the third cooling element unit thermally isolated from both the first radiation shield and the second radiation shield, wherein the third cooling element unit is configured to reduce the target's temperature to at least <4K.

Other embodiments of the disclosure may be characterized as a method for UHV or XHV comprising providing two or more overlapping radiation shields within an inner vacuum space of a vacuum chamber, the two or more overlapping radiation shields covering at least 90% 4π steradians around a target, thermally coupling a first cooling element unit to a first of the two or more overlapping radiation shields, thermally coupling a second cooling element unit to a second of the two or more overlapping radiation shields, thermally coupling a third cooling element unit to the target, the third cooling element unit thermally isolated from the first and second radiation shields, cooling the first radiation shield to <100K, cooling the second radiation shield to <25K, cooling the target to <4K, and interacting an elongated tool with the target through one or more apertures in the first and second radiation shields, while maintaining the at least 90% 4π steradians coverage around the target.

Some other embodiments of the disclosure may be characterized as an apparatus for UHV or XHV comprising two or more overlapping radiation shields within an inner vacuum space of a vacuum chamber, wherein the two or more overlapping radiation shields surround at least a portion of a target thereby blocking a majority of blackbody radiation from reaching the target, means for reducing a temperature of the first radiation shield to <100K, means for reducing a temperature of the second radiation shield to <25K, means for reducing a temperature of the target to <4K, and wherein the means for reducing the temperature of the target is thermally isolated from both of the means for reducing the temperature of the first radiation shield and the means for reducing the temperature of the second radiation shield, and means for interacting with the target via one or more apertures in the first and second radiation shields.

DESCRIPTION OF RELATED ART

Ultra-high vacuum (UHV) is the vacuum regime characterized by pressures lower than about $10^{-7}$ pascal or 100 nanopascals ($10^{-9}$ mbar, ~$10^{-9}$ torr), while extreme-high vacuum (XHV) is the regime characterized by pressures lower than about $10^{-10}$ pascal. UHV and XHV conditions are created by pumping the gas out of a UHV/XHV chamber. At these low pressures the mean free path of a gas molecule is greater than 40 km, so the gas is in free molecular flow, and gas molecules may collide with the chamber walls many times before colliding with each other. Thus, in some aspects, almost all molecular interactions take place on various surfaces in the chamber.

UHV/XHV conditions are integral to scientific research as well as to modern technology. Surface science experiments often require a chemically clean sample surface with the absence of any unwanted adsorbates. Surface analysis tools such as X-ray angle-resolved photoemission spectroscopy (ARPES), scanning tunneling microscopy (STM), and low energy ion scattering require UHV conditions for the transmission of electron or ion beams. For the same reason, beam pipes in particle accelerators such as the Large Hadron Collider are kept at UHV. In some cases, MBE growth chambers require UHV conditions to remove contaminants that would otherwise disrupt the pristine crystal during growth. In some circumstances, ion traps for quantum information experiments may be hindered by UHV levels not being low enough to prevent residual gas particles from knocking ions out of the trap, thus shortening the lifetime of the experiment.

Maintaining UHV/XHV conditions often involves the use of specialized materials for the equipment that can withstand high temperatures, as well as to maintain low out-gassing rates and vapor pressures. In some cases, after venting the equipment to atmosphere, the entire system may be heated above 100° C. or higher for many hours ("baking") to remove water and other trace gases which adsorb on the surfaces of the chamber to prevent materials from out-gassing particles into the vacuum during operation. Thus, long-term operation (i.e., without baking) has yet to be achieved.

In some cases, low pressures (or high vacuum) conditions are often achieved by affixing one or more pumps to the chamber and removing gas particles via pumping. Accordingly, the pressure or vacuum is a function of the number and quality of the pumps over the volume of the chamber, and a practical limit to the pressure floor is the number and size of holes in the chamber that one can make for addition of further pumps. In other words, for a given chamber size, there is a limit to the pumping rate.

Figure 5:
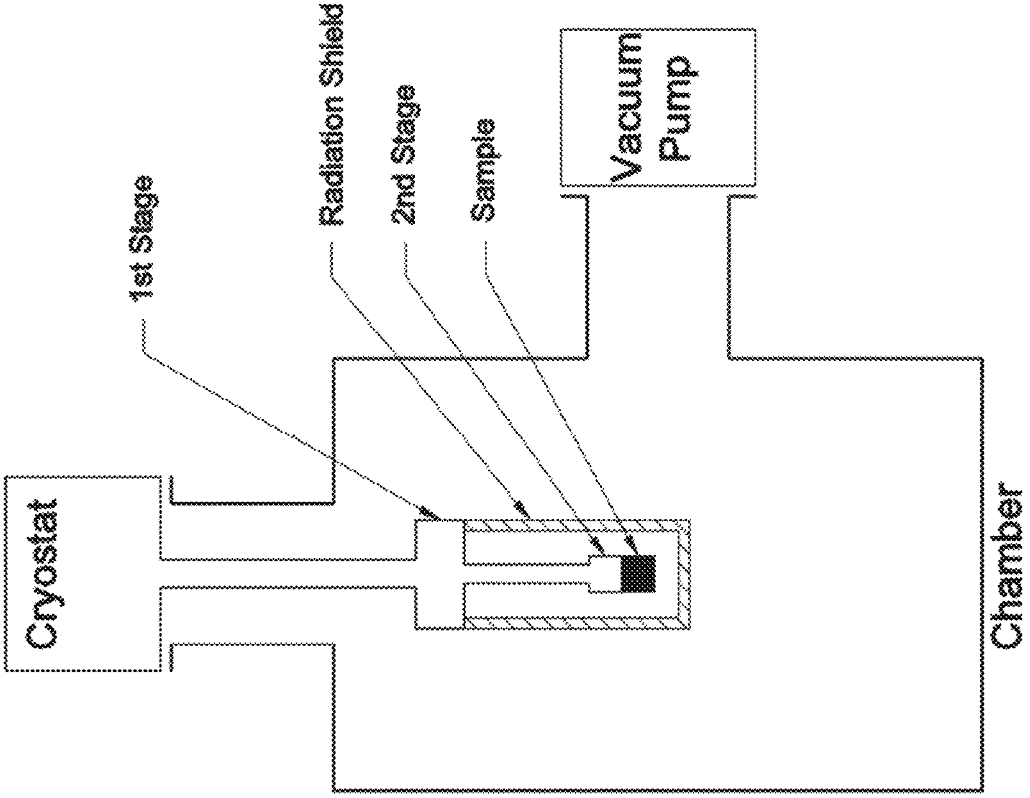
(PRIOR ART) FIG. 5
FIG. 5 illustrates a prior art vacuum system with a cryostat, vacuum pump, and target.

Low temperature conditions are often achieved via the use of one or more radiation shields around the portion of the chamber that is to reach the lowest temperatures (e.g., around a target, such as a sample or an experimental tool). In some cases, these radiation shields may be cooled (e.g., to 77K) to reduce their thermal blackbody radiation and block radiation from outside the shield (e.g., from the chamber walls, which are typically at around 300K). Accordingly, cooling efforts can be focused on removing thermal energy from within the volume enclosed by the shield(s) without having to fight thermal energy imparted from incident thermal radiation. In some cases, the radiation shield(s) may be cooled via direct contact with the same cryostat that is also used to cool the target or experimental tool (e.g., see FIG. 5; see also U.S. Pat. No. 5,339,650, US20100219832, U.S. Pat. No. 4,765,153). For instance, the radiation shield may be thermally coupled to a first stage of a two-stage cold head (also referred to as a cryohead), where the second stage is thermally coupled to the target and the second stage and target are enclosed by the radiation shield. However, when one or more of these radiation shields are thermally coupled to the cooling element, any changes in temperature of the cooling element (e.g., intentional temperature scans of the target) may be propagated into the shield(s) leading to unwanted out-gassing of adsorbed particles, instability of position via thermal expansion, or a combination.

In some cases, such as in molecular beam epitaxy systems (or MBEs), it may be desirable to remove residual gas particles from a vacuum chamber during sample growth. To do this, MBEs may use one or more panels cryogenically cooled (e.g., to 77K or lower), via direct contact with liquid nitrogen, to "freeze out" residual gas from the vacuum. In other words, when "warm" gas particles contact the cryopanel(s), they condense and freeze on to the cryopanel(s), thereby effectively removing the "warm" gas particles from the chamber. In some cases, these cryopanels may need to be periodically regenerated because they quickly become saturated with particles under high gas loads and are no longer able to remove particles from the vacuum. In some examples, regeneration involves periodically bringing the cryopanel(s) to an elevated temperature such that the frozen gases/particles can be purged from the cryopanel and the system. This means that cryopanels can only maintain desired vacuum pressures for limited periods of time.

In some other cases, angle-resolved photoemission spectroscopy (ARPES) tools are often used to detect electron emissions from cold targets held in a vacuum. While the targets are often cooled, the ARPES tool is not, and thus acts as a source of blackbody radiation and particle emission (e.g., due to inadequate vacuum) to the target. If the target (or sample) is enclosed within a cryogenically shielded vacuum chamber, then the 'warm' surfaces of the ARPES tool can act as (a) a heat source (via blackbody radiation) to the cold target. In some cases, this blackbody radiation may dominate the heat load on the target, impacting the lowest target temperatures that can be obtained. (b) Additionally or alternatively, since the vacuum levels within a warm analyzer are not as good as they are inside the cryogenic vacuum chamber, the ARPES tool may act as a gas contamination source aimed directly at the cold target surface. In some aspects, this will decrease the clean target lifetime (time period until a target has frozen out so many particles from the vacuum that the target must be cleaned or replaced) compared to the ideal situation. (c) In some other cases, the ARPES tool may also act as a gas contamination source towards certain gas-sensitive components in the system, for example in an exchange-scattering spin detector.

DETAILED DESCRIPTION

The word "exemplary" is used herein to mean "serving as an example, instance, or illustration." Any embodiment described herein as "exemplary" is not necessarily to be construed as preferred or advantageous over other embodiments.

In modern vacuum systems, the vacuum chamber and vacuum pump are considered to be two separate devices that are attached to one another. When the lowest possible vacuum is required, the vacuum pump is chosen to be a type with the highest pumping speed and lowest ultimate pressure available, such as a cryopump, where the volume within the charcoal fins is surrounded by <15K in all directions and the vacuum levels can attain XHV pressures. The motivation behind this disclosure is to create a vacuum chamber that generates the thermal and vacuum conditions that exist inside of a cryopump by converting the chamber walls into cryopumps. This is achieved by cryo-cooling radiation shields lining a substantial portion, e.g., >90%, >95%, >99%, of the internal surface area of the vacuum chamber. In the limit where the radiation shields are nearly the same size as the chamber itself, almost all of the internal surfaces become pumping surfaces, similar to inside a cryopump. Furthermore, these radiation shields can be cooled by a dedicated cryostat such that any internal experimental device or process is completely decoupled from the shields and chamber. When the chamber, radiation shields, and dedicated cryostat are viewed as a single unit, the vacuum chamber and vacuum pump are no longer separate devices because the chamber itself has become the pump.

It is believed that radiation shields that are cooled by a dedicated and isolated cryostat (e.g., a cryohead or cold-head) have seldom or ever been cooled to less than 77K, have not utilized closed-cycle refrigerators, and have not fully encased the target space within a UHV/XHV chamber (i.e., where "fully encased" means covering at least 90% 4π steradians around the target).

To these ends, the present disclosure relates to systems, methods and apparatuses for an UHV or extreme-high vacuum (XHV) chamber using two or more overlapping cryogenically-cooled radiation shields, thermally-isolated from the cooling element used to cool the target or experimental tool. In other words, the herein described systems, methods, and apparatuses include UHV or XHV chambers using two or more radiation shields to increase the pumping speed (via increased pumping surface area) of the chamber. In one embodiment, two or more cryogenically-cooled radiation shields can be arranged around the target or experimental tool, where an outer radiation shield may be cooled to <77K, <70K, <50K, or <35K and the inner radiation shield may be cooled to <20K, <15K, <4.4 K, or <4K. In one aspect of the disclosure, such a system can be applied to a particle detector system (e.g., ARPES system) to help cool the detector surfaces, provide improved black body radiation shielding, improved electrical shielding, and/or decreased vacuum levels.

In some cases, the ability to cool radiation shields below 77K (e.g., 25K or 15K or 4K or 2.8K) may allow for effective pumping of all gas species, including hydrogen, which is the dominant gas preventing current UHV systems from attaining true XHV pressures. The benefit of using closed-cycle refrigerators is twofold: it allows for the use of sorbent materials on the colder second-stage radiation shield, thus minimizing gas saturation and reducing the frequency of regeneration (i.e., down-time seen with cryopanels needed to regenerate the sorbent panels), and is more convenient and long-term cost effective than the prior art because it eliminates the need for expensive and wasteful liquid cryogens such as liquid nitrogen ($LN_2$) and liquid helium (LHe). In some cases, fully enclosing the target space with a nearly perfect vacuum pump (i.e., the radiation panel(s) act as pumps by freezing out gases/particles) may allow the vacuum chamber to reach its theoretical limit of maximum pumping speed, and therefore lowest vacuum level. Furthermore, this full enclosure in radiation shielding at low temperatures (e.g., sub-4K) also reduces the thermal radiation load onto the target to virtually zero, allowing the herein disclosed target cryostats to attain their minimum base temperature while still maintaining access and manipulation of the working environment for the experimental system via doors, shutters and baffles that are actively cooled by the shields. As described above, a "full enclosure" may be defined as the radiation shields covering at least 90% 4π steradians around the target.

Figure 2:
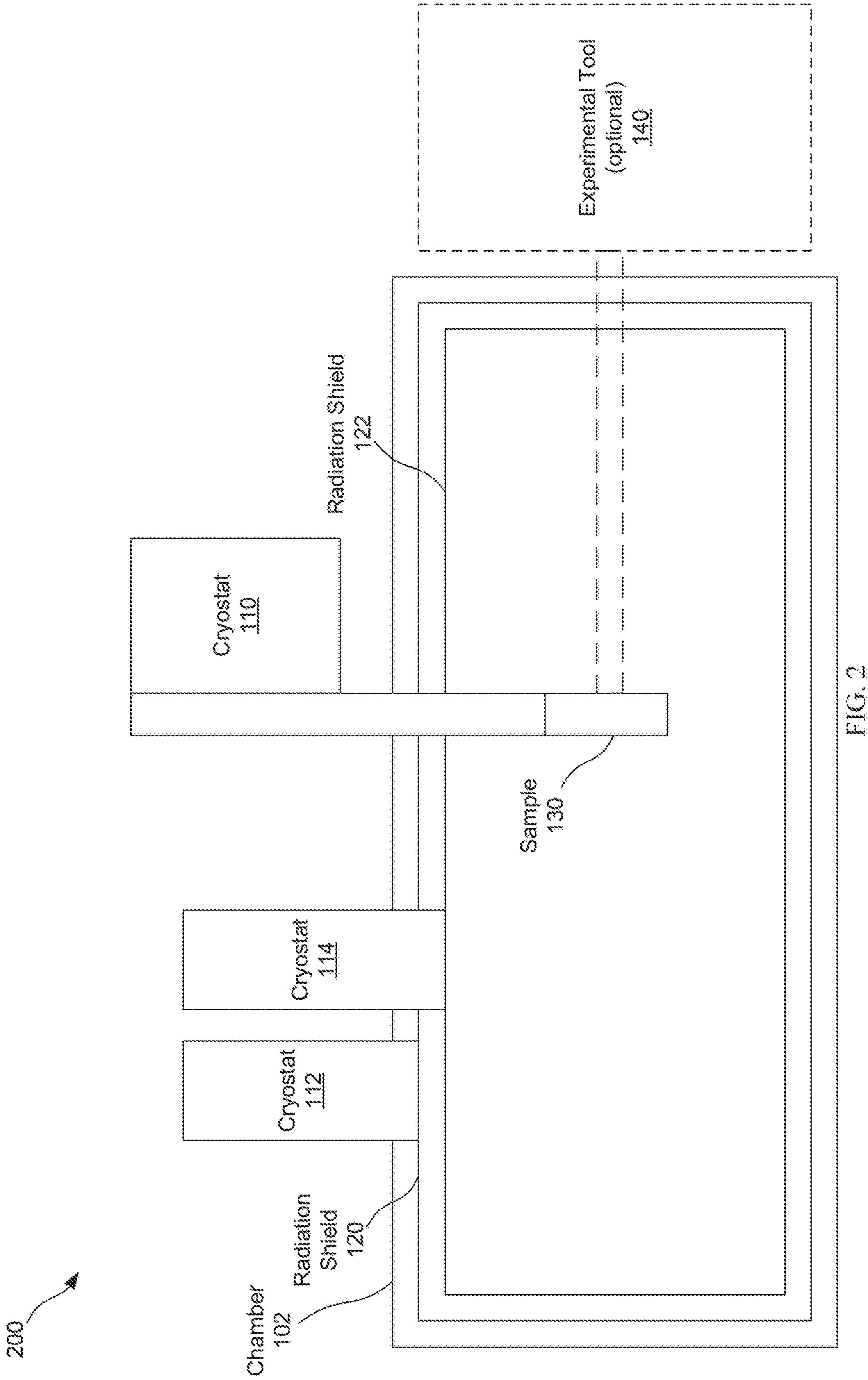
FIG. 2 illustrates the same UHV or XHV vacuum system of FIG. 1 with the addition of a second dedicated cryostat and second shield.
Figure 3:
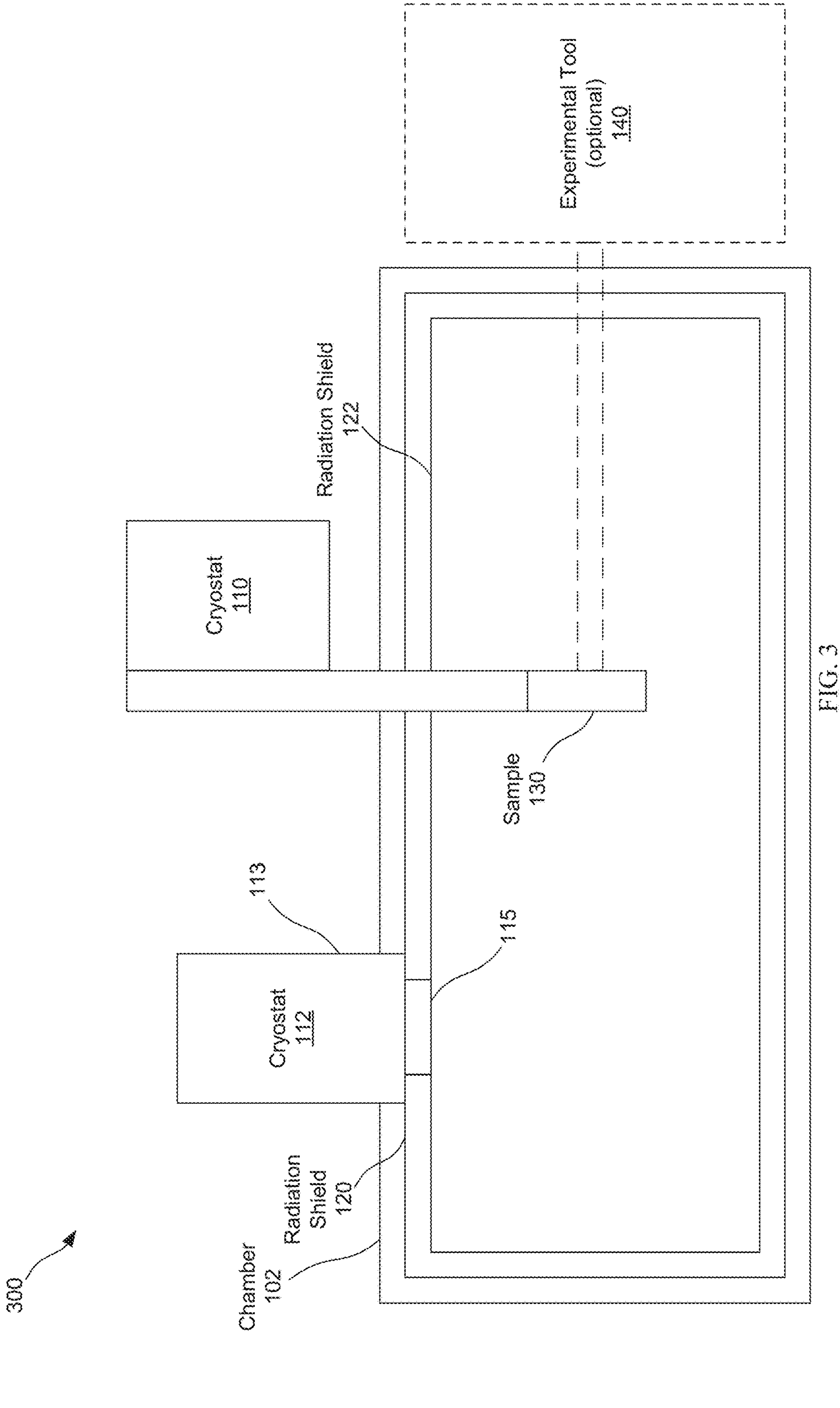
FIG. 3 illustrates the same UHV or XHV vacuum system of FIG. 2. with a two-stage dedicated shield cryostat.
Figure 4:
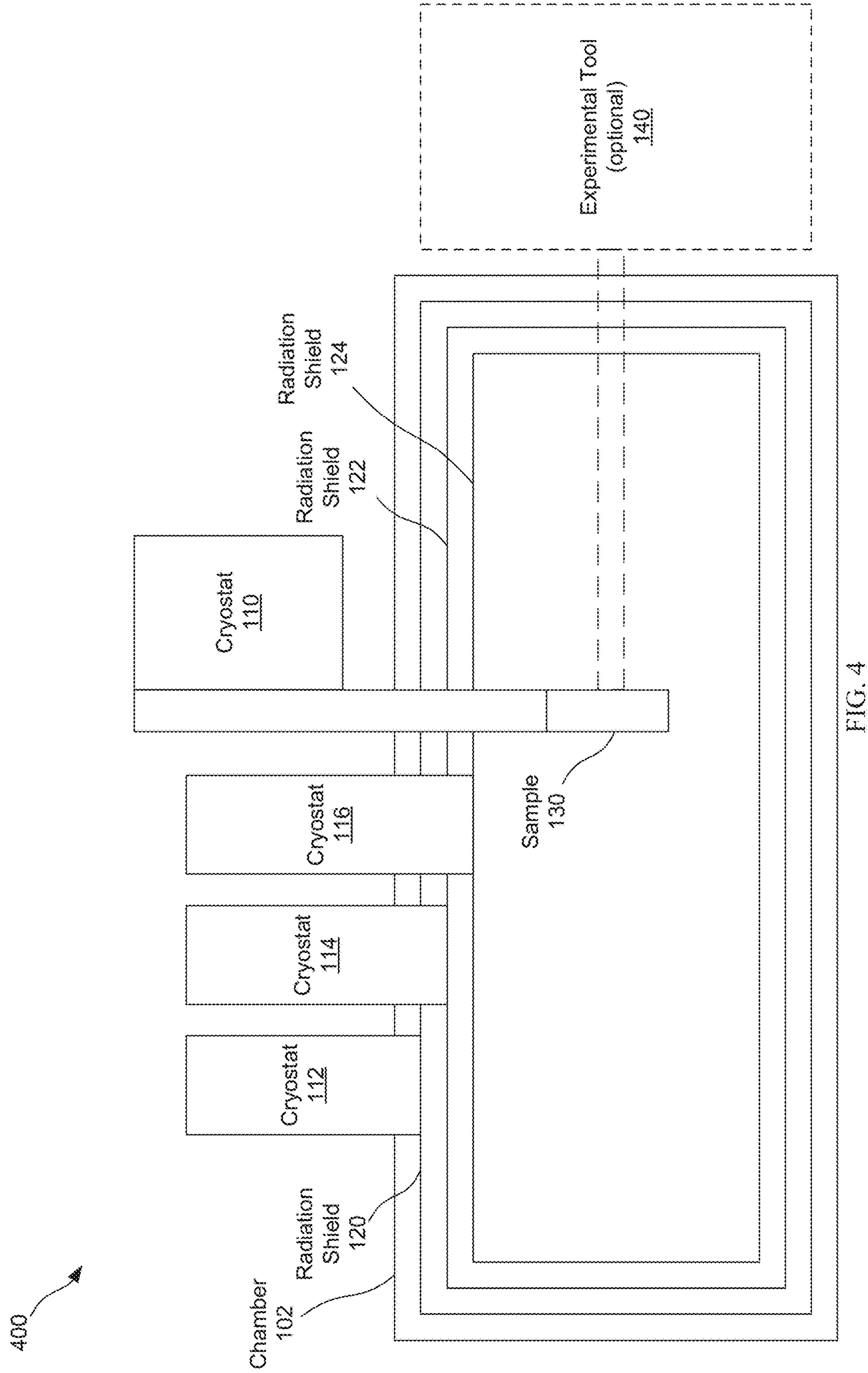
FIG. 4 illustrates a UHV or XHV vacuum system with three radiation shields, three shield cryostats, and a cryostat with target.

FIG. 1 illustrates an ultra-high (UHV) or extreme-high vacuum (XHV) system 100 including a chamber 102, a radiation shield 120, a dedicated shield cryostat 112, a second cryostat 110, a sample (or target) 130, and optionally an experimental tool 140. FIG. 2 illustrates the same UHV or XHV vacuum system with an additional dedicated shield cryostat and additional radiation shield. The sample 130 can be coupled to a "manipulator" of the second cryostat 110 and thereby thermally coupled to the second cryostat 110. In some cases, the sample can include a superconducting circuit, or any other object to be operated at or near absolute zero (i.e., ~0K temperatures), and/or within UHV or XHV.

As illustrated in FIG. 1, the second cryostat 110 may be thermally isolated from the radiation shield 120, while the dedicated shield cryostat 112 can be thermally coupled to the radiation shield 120. In some circumstances, such an arrangement allows the dedicated shield cryostat 112 to control a temperature of the radiation shield 120 independently from changes in the second cryostat 110. In the example shown, the sample 130 may be completely isolated from atmosphere via the chamber 102. In some cases, the chamber 102 may be composed of stainless steel, a high permeability material such as mu metal, supermalloy, supermumetal, or molybdenum permalloy. In some examples, the second cryostat 110 may cool the sample 130 to anywhere from room temperature to a temperature of order 10 mK or below.

As illustrated, the radiation shield 120 may surround and enclose a majority of the sample 130. Furthermore, although the radiation shield 120 likely includes one or more openings or gaps to allow for entry of the second cryostat 110, load locks, the optional experimental tool 140, viewing windows, pump apertures, etc., in an embodiment, the radiation shield 120 may cover greater than 90%, or 95%, or 99%, or 99.5% 4π steradians around the sample 130.

In some cases, the dedicated shield cryostat 112 may be thermally isolated from the second cryostat 110. Further, the dedicated shield cryostat 112 can be coupled to the radiation shield 120 so that the radiation shield is cooled to <77K, <70K or <50K, or <45K. At these temperatures, one or more gas species within the chamber 102 may freeze onto the radiation shield 120. In such cases, the radiation shield 120 may act as a distributed vacuum pump.

As illustrated, the radiation shield 120 may be of comparable size to the chamber 102 such that they are separated by a small gap (e.g., 0.5"-3"). The aspect ratio of this small gap to the chamber size is preferably small enough (e.g., gap/chamber<10%) such that gas molecules departing from the 300K chamber wall are much more likely (e.g., >75%) to strike the shield and freeze than they are to strike another 300K surface. Provided that the shield is cold enough to pump certain gas species, this small gap forces nearly all gas molecules of those species to be pumped on their first or second departure rather than after hundreds or even thousands of departures.

For the purposes of this disclosure, a radiation shield (such as radiation shield 120) may be structurally different from other types of vacuum shielding because its base material, physical isolation, and surface finishes may be engineered to reduce thermal radiation from the surrounding ~300K chamber onto the sample, or to greatly improve the effective pumping speed around the system so as to enable much better vacuum conditions, or both. In some examples, the base material can be selected to be an excellent thermal conductor at temperatures below 300K (e.g., OFHC copper, 99.999% aluminum, etc.) so that incident heat can be removed rapidly, allowing it to maintain a very low base temperature. Additionally or alternatively, the shield can be physically isolated from the warm chamber (e.g. via special mechanical connections) to minimize heat leaks that might raise its base temperature. In some other examples, the surface finishes can be chosen to be highly reflective (or to have low emissivity) on the outer surface (e.g., nickel or gold plating) to reflect away as much 300K radiation as possible. Conversely, parts of the inner surface (or any surface) can be chosen to be highly absorbent (e.g., black finish) to prevent any radiation from reflecting deeper into the system towards the target, while other parts can also be made reflective to lower the emissivity toward the target. It should be noted that a cryostat is just one example of a "cooling element" that can be used to cool any of the herein disclosed targets or the radiation shield(s). In an embodiment, one or more of the cryostats mentioned in this disclosure can be closed-cycle.

An associated benefit of this disclosure is that the cooled radiation shield 120 that encases the workspace and sample 130 gives a drastic reduction in the thermal or "blackbody" radiation that impinges the working space and sample. This follows from the $T^4$ scaling of blackbody radiation, so that a reduction of the surrounding temperature from 300K (room temperature) to 10K is a reduction of the thermal load by a factor of $30^4$ or 810,000. This drastically reduced thermal load enables much more effective and simpler designs for the separate second cryostat 110 (i.e., the sample cryostat), for example allowing much colder attainable temperatures, less liquid helium consumption for the cryogenic manipulators, and/or the ability to design effective closed-cycle manipulators of small size that significantly outperform cryogenic manipulators in chambers without separately cooled radiation shields. Applications for this include the development of XHV ARPES (discussed later and see FIGS. 12-22) and STM chambers with ultra-low temperature sample manipulators.

Figure 6:
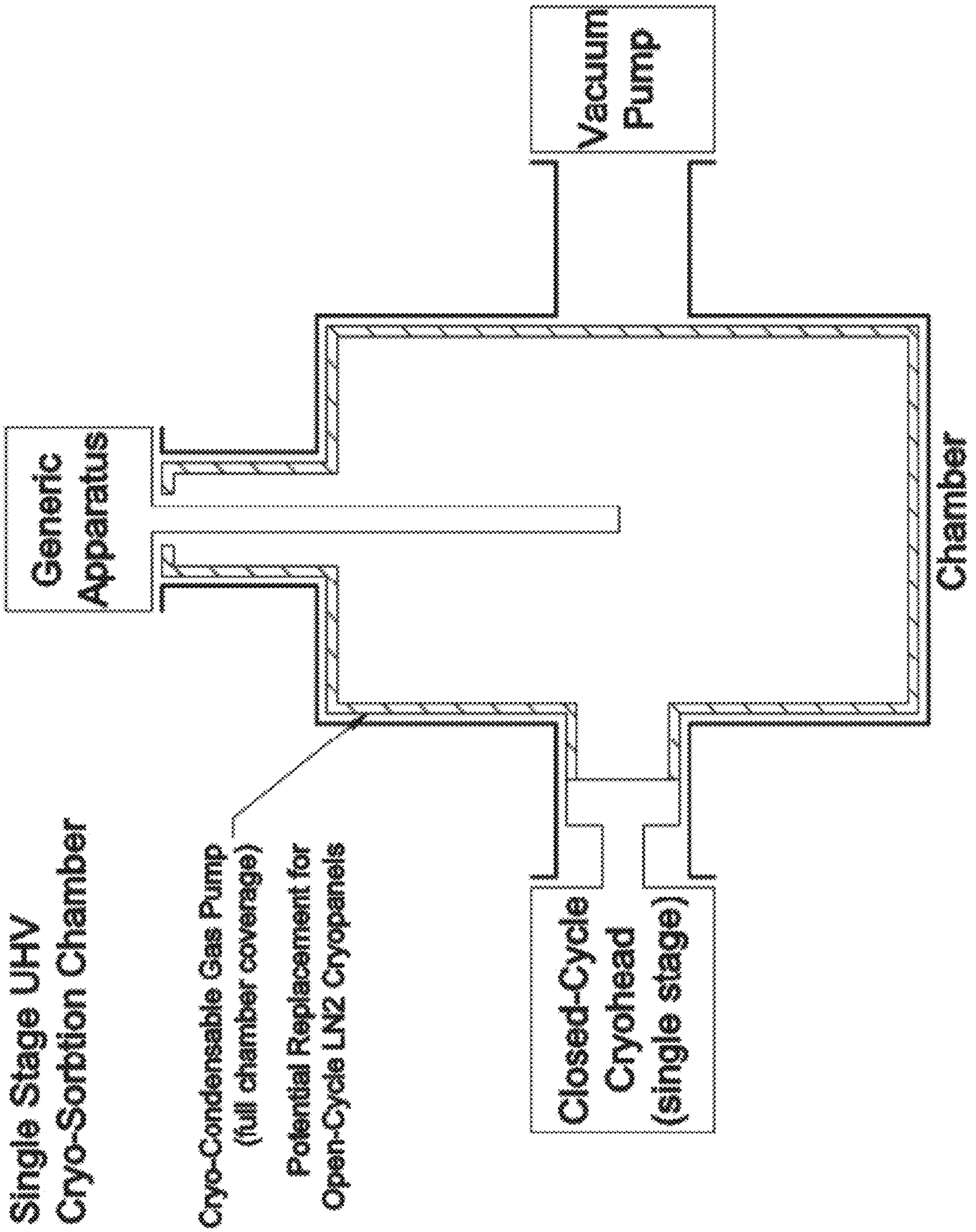
FIG. 6 illustrates another embodiment of a UHV chamber with a single cooled radiation shield.

FIG. 6 illustrates another embodiment of a UHV chamber with a single cooled radiation shield.

Although more than two radiation shields can be implemented, and although the single-shield embodiments of FIGS. 1,6, 14, and 15 may not get cold enough to attain XHV vacuum levels, a single-shield embodiment may have a cold enough shield to pump most heavier gases, including water, which is one of the most problematic to remove from vacuum systems. In some cases, a single-shield embodiment using a closed-cycle cooling element coupled to the radiation shield could be a potential replacement for the liquid nitrogen-cooled shields in some current MBE systems.

In other embodiments, two or more radiation shields can be used, as seen in FIGS. 2, 3, 4, 7, 8, 9, 10, and 11. In such cases, each radiation shield may be thermally coupled to its own cooling element (e.g., a separate closed-cycle cryohead). For instance, in FIG. 2, radiation shields 120, 122 are thermally coupled to independent cooling elements of cryostats 112 and 114, respectively. In other embodiments, a single two-stage cryostat (e.g., cryostat 112 in FIG. 3 and the closed-cycle cryohead (dual-stage) in FIGS. 7 and 8) can be used to cool each of two radiation shields 120, 122, where the second stage (connecting to the inner radiation shield 122) reaches temperatures of <25K, or <15K, or <11K, or <4.4K, or <4K, or <3.5K, or <2.8K. Typically temperatures below 15K can lead to XHV operation.

It should be noted that for low-temperature applications and XHV conditions it may be beneficial to cover all open ports, such as those used for sample transfer, evaporation, viewing, etc., with cooled shields (not illustrated), since even 1% of the 4π steradians that is at 300K and directed towards the cryogenic sample may dominate over the other 99% that is at low temperatures (e.g., 4K). In some aspects, these ports can be closed up or partially closed up via two-piece "clamshell" designs (e.g., see FIG. 9), where each of the pieces of the clamshell are cooled. In some circumstances, the two-piece clamshell design may also include separate cooled shutters for each port or for viewing, and a cooled transparent window made of a thermally conductive material such as sapphire.

In each of these embodiments, cooling overlapping radiation shields and arranging them within the chamber and close to the inside walls of the chamber may optimize the effective pumping speed of the chamber, since vacuum pumps can be combined with the effects of “freezing” or cryosorbing gases out of the vacuum onto the radiation shields. In some cases, the radiation shields have a finite surface area and will eventually saturate with sorbed gas, such that any additional impingent gas on the shield will no longer stick to the shield. In some examples, the total amount of sorbed gas can be greatly increased by increasing the available cold surface area, for example, by the addition of a sorbent material that is thermally sunk (e.g., thermally coupled to, glued, affixed) to one or more of the radiation shields (e.g., to the inner radiation shield).

In one example, the sorbent material may be a microporous material (e.g., activated coconut charcoal, molecular sieve, anodized aluminum, etc.) that has a high effective surface area (e.g., >1,000 $m^2$ per gram), for instance, due to countless microscopic cavities and interconnecting channels that penetrate through the bulk of the material. By cooling the sorbent material down to the temperature of the radiation shield, the total cold pumping area of the shield can be increased (e.g., by 10,000 times or more). For lighter gases that are still quite mobile on a cryosorbed surface (e.g., $H_2$), this also increases the amount of time until the shield becomes saturated (e.g., by the same 10,000 times or more). For instance, the sorbed gas may migrate along the surface of the radiation shield until it reaches the sorbent material where it is captured.

It should be noted that cryopanels operating at higher temperatures (e.g., 77K) are incompatible with the herein disclosed sorbent materials since such “warm” cryopanels tend to pump cryo-condensable gases (e.g., $H_2O$, $O_2$, $CO_2$, etc.), causing the surface of a sorbent to plug up before the inner pores can be fully loaded. Thus, one of skill in the art would not consider the use of a sorbent material on a cryopanel that was cooled to roughly 77K. This challenge is overcome in this disclosure via the use of two radiation shields, an outer shield cooled to a warmer temperature (e.g., <100K) that freezes out the cryo-condensable gases that would otherwise plug up a sorbent material, and then an inner radiation shield cooled to a lower temperature (e.g., <25K, or <15K) and thermally coupled to a sorbent material that greatly increases the surface area of the inner shield while not being susceptible to plugging. Examples can be seen in FIGS. 7 and 8.

Figure 7:
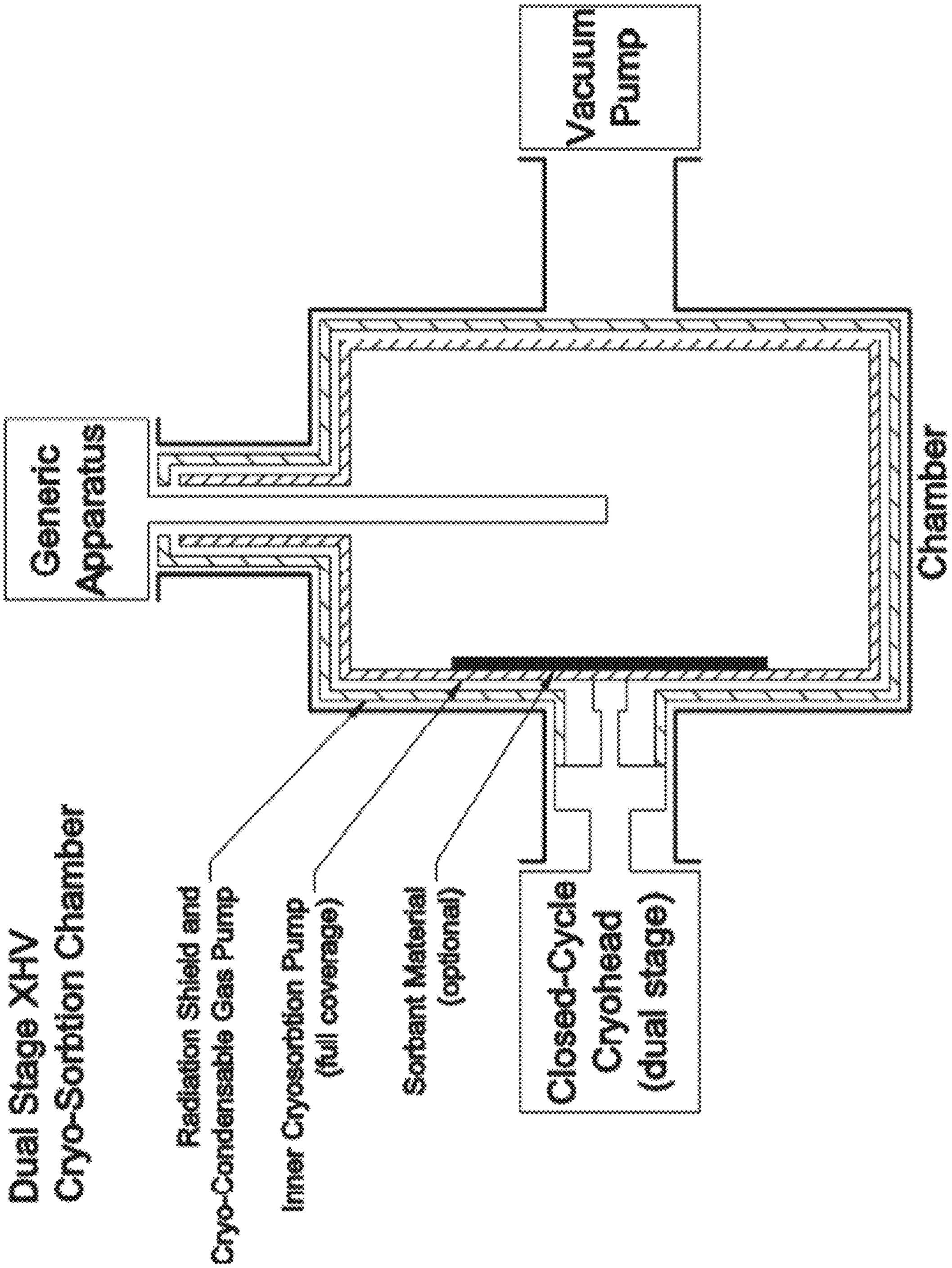
FIG. 7 illustrates a UHV or XHV vacuum system with two radiation shields, a two-stage cryostat, an optional sorbent material, a vacuum pump, and a generic apparatus.
Figure 8:
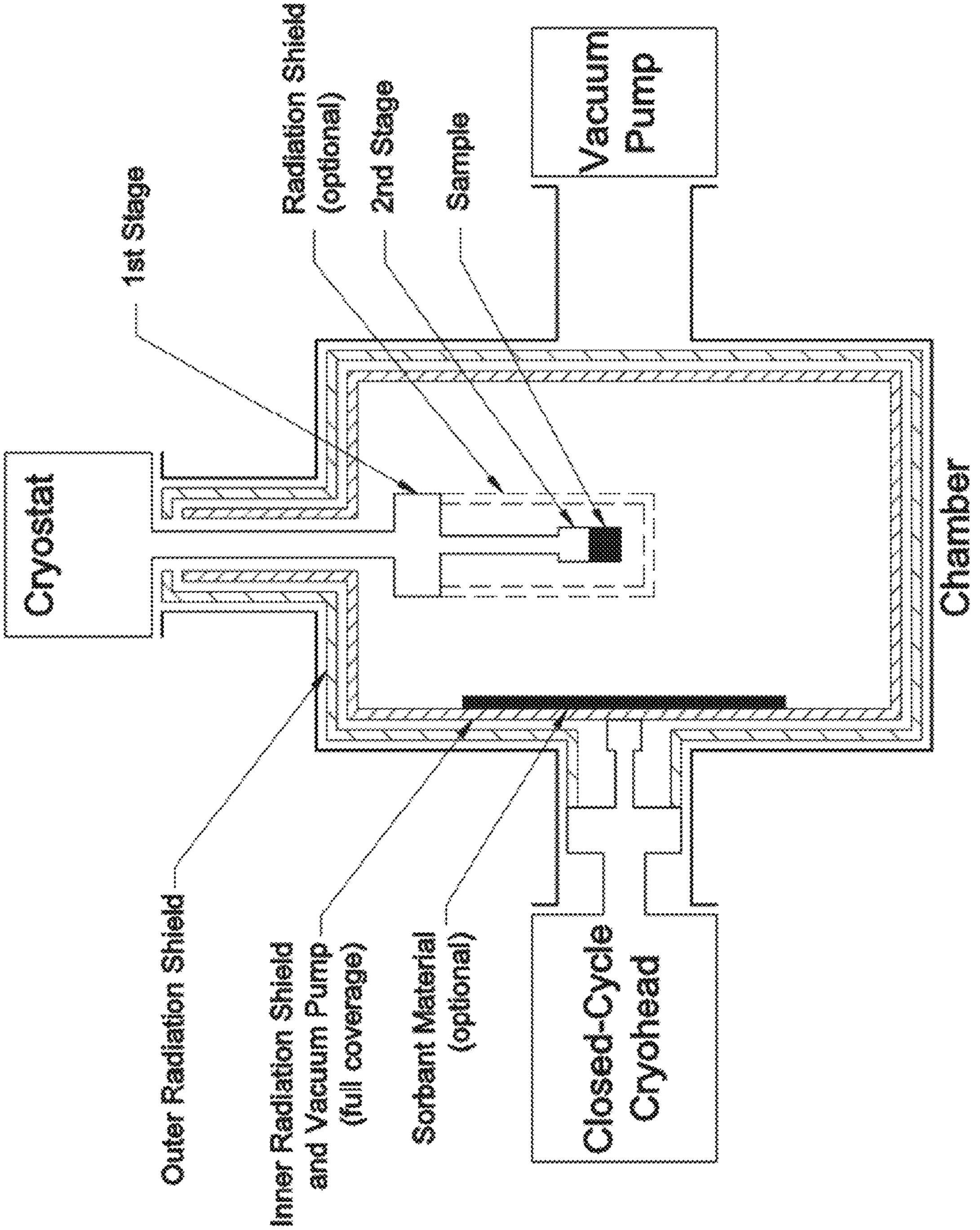
FIG. 8 illustrates a UHV or XHV vacuum system with two radiation shields, a two-stage cryostat, an optional sorbent material, a vacuum pump, and a cryocooled target.
Figure 9:
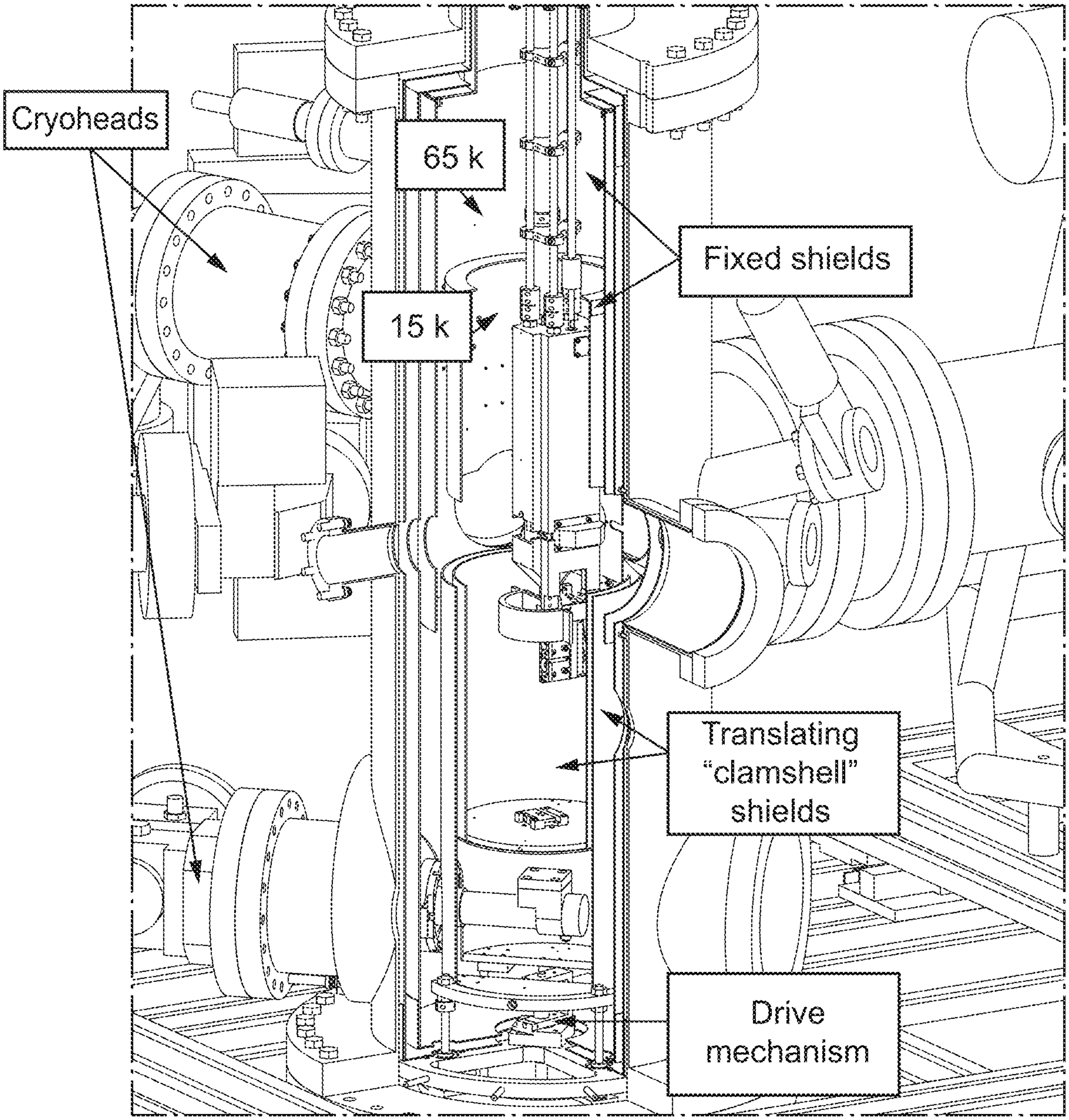
FIG. 9 shows a UHV or XHV vacuum system having two cryocooled radiation shields via a cross sectional illustration.
Figure 10:
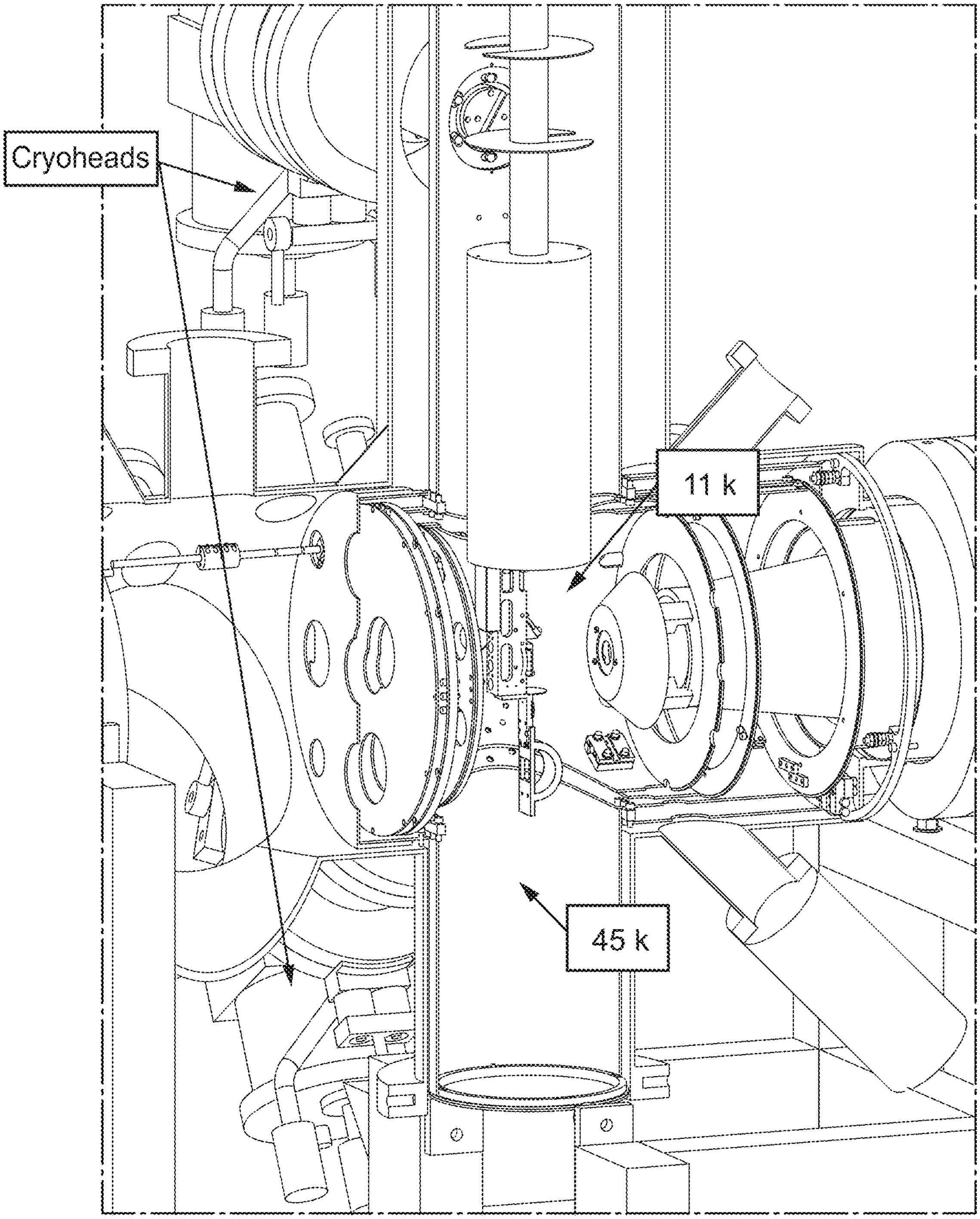
FIG. 10 shows another UHV or XHV vacuum system having two cryocooled radiation shields via a cross sectional illustration.
Figure 11:
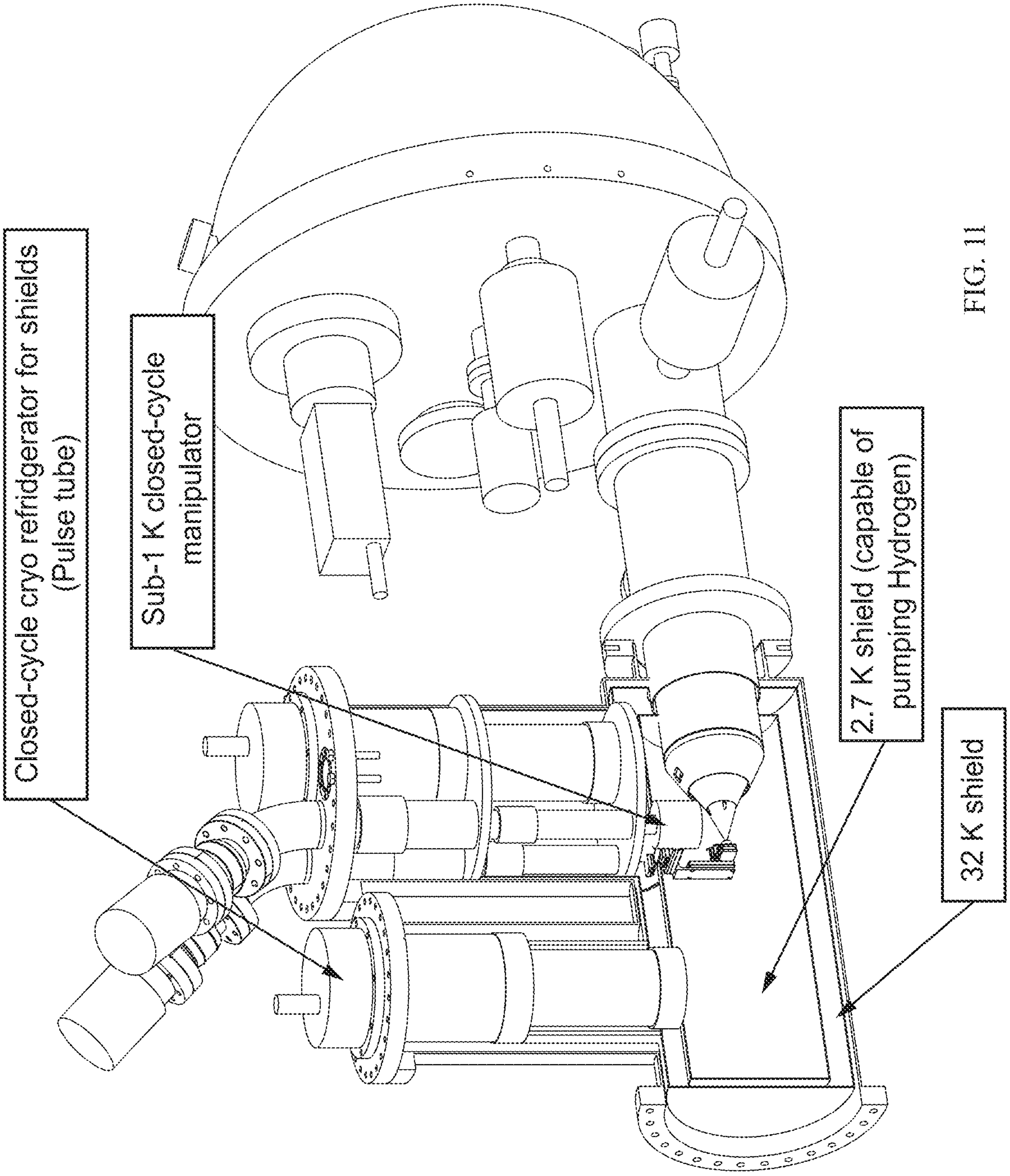
FIG. 11 illustrates a perspective view of a cross section of a UHV or XHV vacuum system having two cryocooled radiation shields, a cooled target, and a hemispherical ARPES analyzer.

To further prevent the sorbent material from plugging as noted above, the sorbent material can be enclosed within a separate radiation shield (e.g., the outer radiation shield of FIGS. 7 and 8) so that all cryo-condensable gases will freeze onto the outer radiation shield before they can migrate deeper toward the sorbent on the inner shield (e.g., the inner radiation shield of FIGS. 7 and 8). The amount of coverage of the sorbent material on the radiation shield can vary anywhere from small patches (e.g., as in FIGS. 7 and 8) to full coverage of the entire shield, and the sorbent material can be arranged on an inner surface of the shield (or anywhere on the shield), an outer surface of the shield, or a combination of both. Preferably, the arrangement of shields and sorbent material enables most if not all cryo-condensable gases to freeze onto an outermost radiation shield before they can reach the inner radiation shield. In some examples, it may be beneficial to thermally sink the sorbent to the coldest portion of the shield (e.g., near the connection to the cryohead as in FIGS. 7 and 8), or to the entire shield if all portions of the shield reach nearly the same base temperature.

Figure 28:
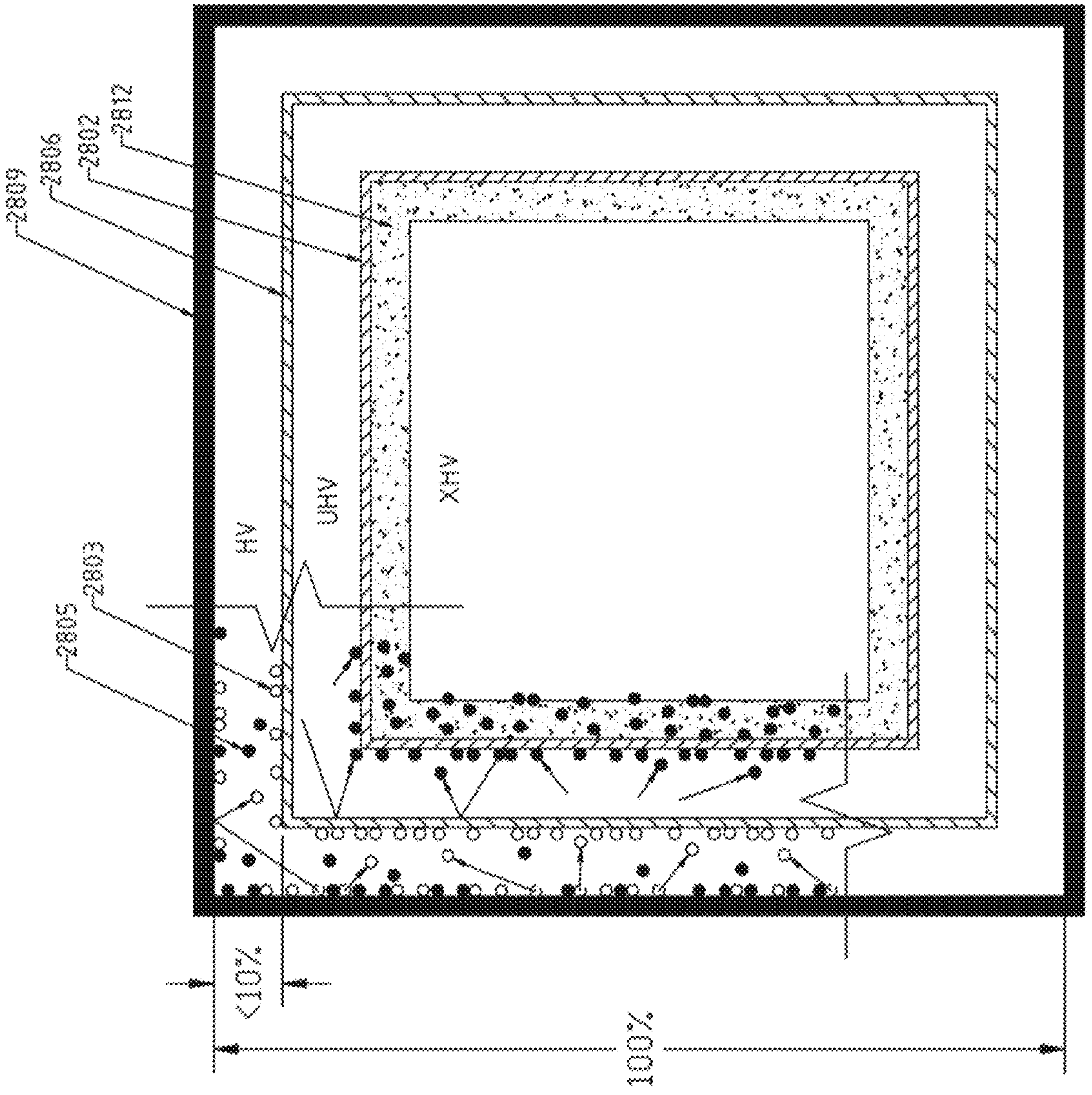
FIG. 28 is a schematic of the XHV chamber shown in FIGS. 2, 3, 7, and 8 showing exemplary relative sizes of the chamber to the intermediate gaps. It also shows the vacuum levels and particle species present in the intermediate gaps.

This arrangement of shields and sorbent material is shown as a schematic in FIG. 28. The vacuum chamber 2809 encloses the outer radiation shield 2806, which encloses the inner radiation shield 2802 with sorbent material 2812 lining the inside. The open circles represent cryo-condensable gases 2803 (e.g., $H_2O$, $O_2$, $CO_2$, etc.) and the solid circles represent cryo-sorbable gases 2805 (e.g., $H_2$, He, etc.). The sorbent material 2812 is protected from cryo-condensable gases because they will encounter and be captured by the outer shield before they can migrate deeper through baffles, shutters, etc. (not pictured).

FIG. 28 also shows that the gaps between the shields are chosen to be small enough (e.g., gap/chamber<10%) such that gas molecules departing from any given surface are much more likely (e.g., >75%) to strike a colder surface and freeze than they are to strike the same surface from where they departed. This is true for both the cryo-condensable gases 2803 and cryo-sorbable gases 2805 onto the outer and inner radiation shields 2806, 2802, respectively. This ensures the maximum pumping speed for all gas species.

As illustrated, the gaps between the shields 2806, 2802 also define distinct vacuum volumes where different gas species and vacuum levels are primarily present. The high vacuum (HV) volume is typical of an un-baked chamber where all species are present, except that the cryo-condensable gases 2803 are preferentially covering the outer shield 2806. The ultra-high vacuum (UHV) volume is typical of a baked chamber where the majority of the cryo-condensable gases 2803 have been removed while the lighter cryo-sorbable gases 2805 dominate. The inner most extreme-high vacuum (XHV) volume offers orders-of-magnitude lower pressures than a typical baked UHV chamber with the majority of all species removed. This structure of cryo-shields and isolated gap volumes, each with maximum possible pumping speed, allows for true UHV/XHV levels to be achieved in an un-baked chamber so the requirements for special high-temperature materials and lengthy baking periods seen in the art are removed.

In some cases, the cold heads thermally coupled to the two radiation shields may be turned on at different times. For instance, a first cold head connected to the outer radiation shield may be switched on, cooling the outer radiation shield to <100K. In some cases, the outer radiation shield may pump out the cryo-condensable gases from the vacuum chamber. Further, a second cold head connected to the inner radiation shield affixed with the sorbent may be switched on a particular duration of time after the first cold head is switched on, or after the partial pressure of one or more cryo-condensable gases in the vacuum chamber falls below a threshold.

In some examples, the sorbent material can be supplied as small solid chunks or pellets (e.g., less than 1 $cm^3$). In such cases, a tightly packed single layer of pieces may maximize the cold pumping surface area while also ensuring that every piece gets cold. The sorbent material can be electro-chemically applied to the entire surface of the shield by means of anodization such that the thermal contact between sorbent and shield is nearly perfect. In some cases, electro-chemical application of the sorbent material can be particularly effective, for instance, where the shield is made from high conductivity aluminum. In such a case, the entire surface can be anodized, creating a porous surface that will act as the sorbent material, while maintaining essentially perfect thermal contact between sorbent and shield. In some cases, XHV conditions can be met when two radiation shields are used, one colder than the other, where the colder inner shield includes a sorbent material, and the sorbent material and inner shield are cooled to at least 15K.

A closed-cycle cold head is one example of the cooling elements herein disclosed, and its major components can include an expander, compressor, vacuum shroud, and radiation shield. In some cases, a cold head may also be referred to as a cryohead, and the two terms may be used interchangeably. The expander, commonly referred to as the cold finger, is where the Gifford-McMahon, pulse-tube, or any other style of cryogenic refrigeration cycle takes place. In some cases, the expander may be connected to a compressor by two gas lines and an electrical power cable. In some examples, one of the gas lines may supply high pressure helium gas to the expander, whereas the other gas line may return low pressure helium gas from the expander. In such cases, the compressor may provide the necessary helium gas flow rate at the high and low pressure for the expander to convert into the desired refrigeration capacity.

In some cases, the vacuum shroud can surround the cold end of the expander in vacuum, limiting the heat load on the expander caused by conduction and convection. In some cases, the radiation shield can be actively cooled by the first stage of the expander and can insulate the second stage from the room temperature (~300K) thermal radiation being emitted from the vacuum shroud. It should be noted that the radiation shield is not required to be one continuous piece and may contain openings for access to the inside; these openings preferably contain overlapping components (e.g., baffles or shutters) so as to prevent direct line-of-sight from the warm vacuum shroud to the colder second stage.

In addition to these major components, the closed-cycle cold head can be accompanied by several support systems. Typically, laboratory systems will have an instrumentation skirt, which provides a vacuum port and electrical feedthroughs, as well as a temperature controller to measure and adjust the target temperature. The system may also include electricity, cooling water for the compressor, and one or more vacuum pumps for the target space. As depicted in FIGS. 6, 7, and 8, the vacuum pump may be connected to one end of the chamber, whereas the closed-cycle cryohead may be connected to a different, second end of the chamber.

Application to Charged Particle Analyzers

Figure 12B:
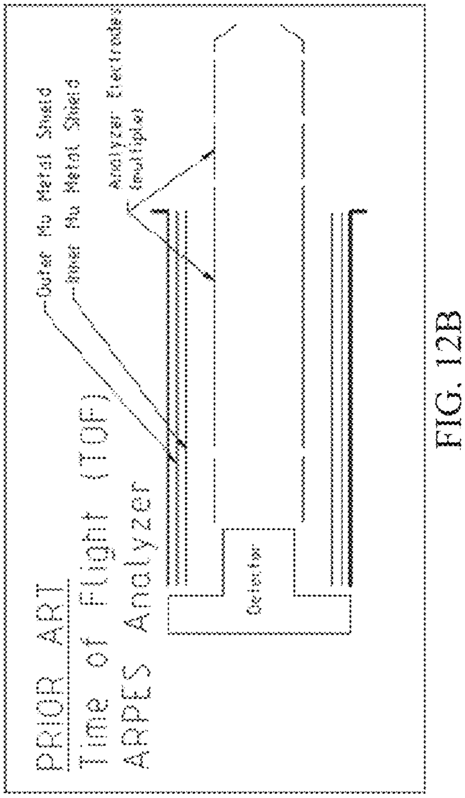
FIG. 12 shows the prior art for a stand-alone hemispherical analyzer and time-of-flight (TOF) analyzer.
Figure 12A:
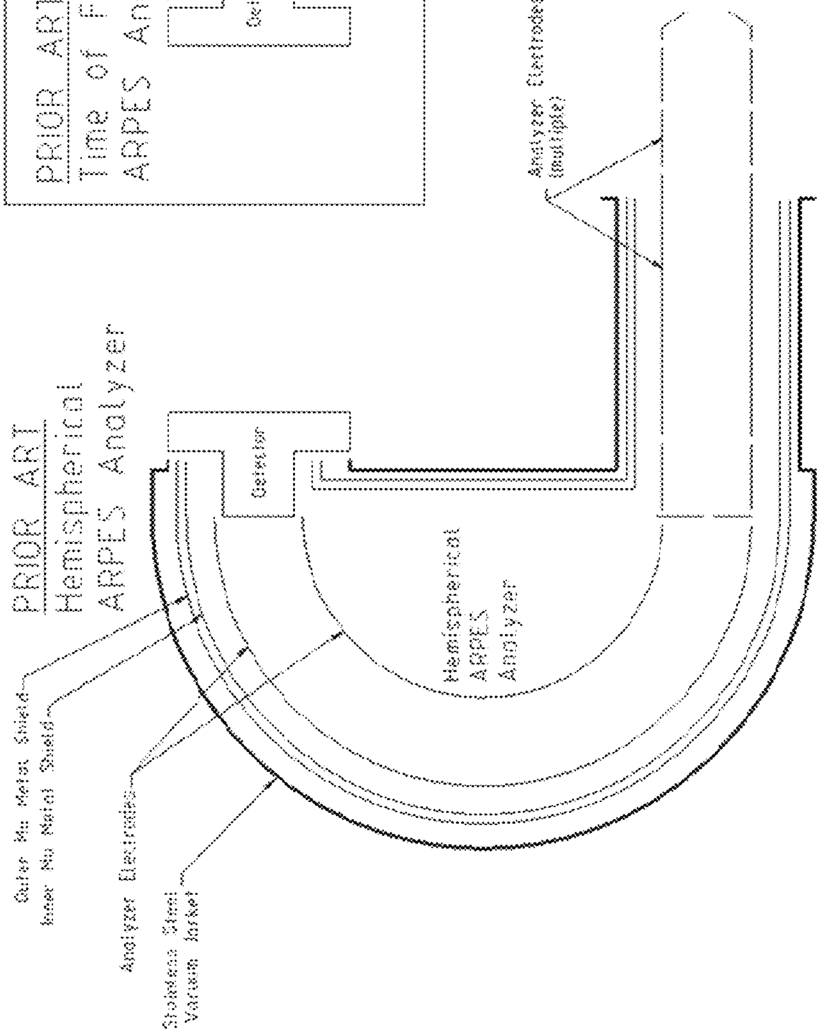

FIG. 12A shows a known Hemispherical ARPES Analyzer while FIG. 12B shows a known Time-of-Flight (TOF) ARPES Analyzer. In both cases the analyzer includes a detector at one end of a vacuum-enclosed chamber, and electrodes running along a length of the tool with an opening in the electrodes at the opposing end where a target can be arranged. The electrodes can be biased to control movement of electrons that leave the target and pass through the electrode opening. A typical ARPES analyzer can include an inner and outer Mu Metal shield and a stainless-steel (or some other material) vacuum jacket. The analyzer electrodes can be electrically isolated from each other.

Figure 13:
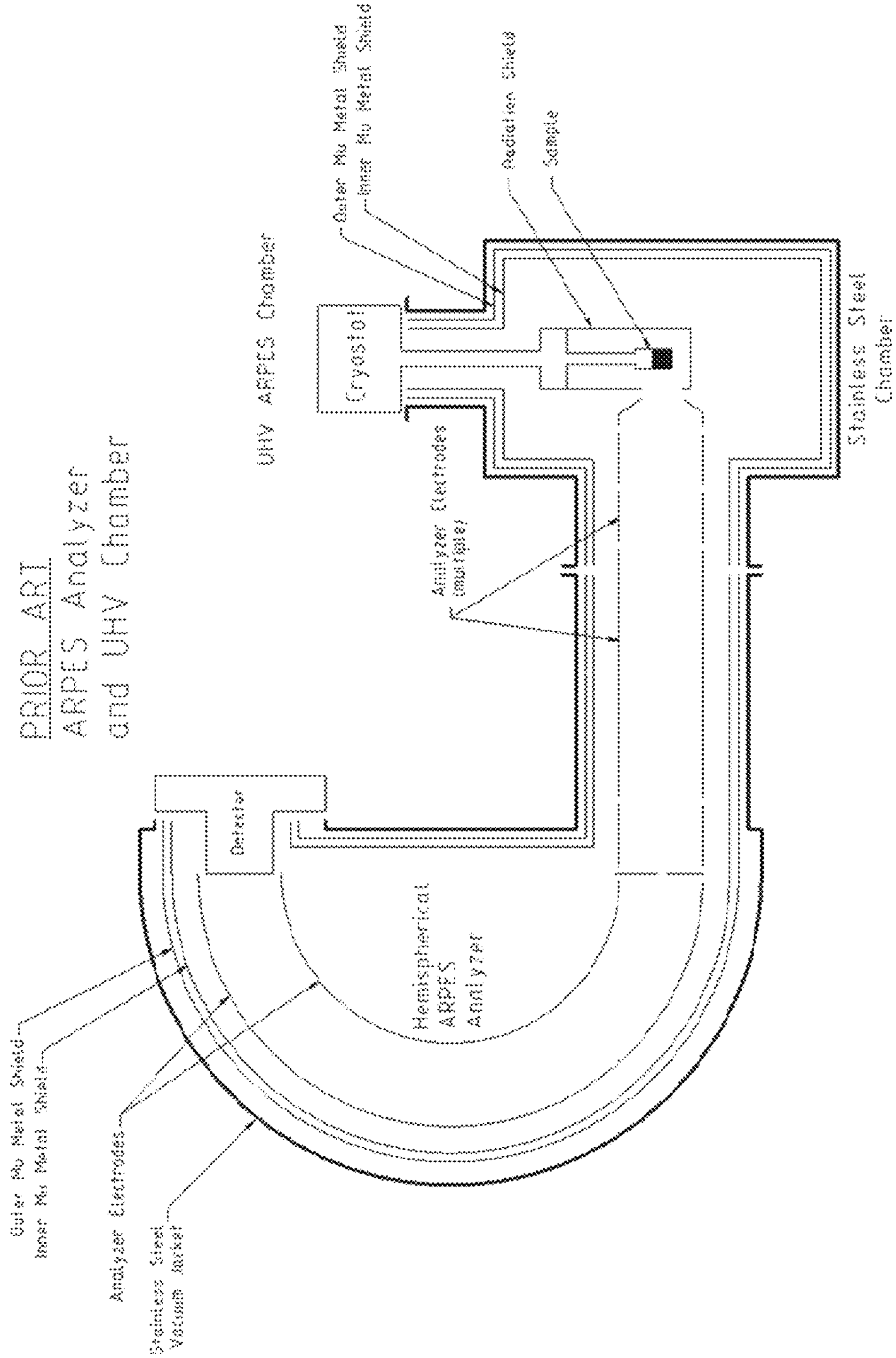
FIG. 13 shows another prior art embodiment of a hemispherical analyzer as it is typically connected to an UHV chamber with a target.

FIG. 13 shows a known Hemispherical ARPES Analyzer coupled to a UHV chamber. The UHV chamber can include a target and a cryogenic target manipulator (i.e., to couple the target or sample to a cold head) with a radiation shield. To reduce the unwanted effects of the 'warm' surfaces of the ARPES analyzer on the target, the opening in the radiation shield adjacent the target is often minimized.

Despite previous attempts to reduce black body radiation and achieve low vacuums in ARPES vacuum chamber systems, application of cooled radiation shields as discussed relative to FIGS. 1-11 can further decrease the black body radiation and vacuum pressure of known ARPES systems. In particular, a closed-cycle cryogenic cold head(s) may be coupled to the analyzer electrodes and/or to one or more radiation shields within the vacuum jacket to increase the effective cold pumping surface area of any existing vacuum device. Additionally, the cooled radiation shield(s) have the added advantage of acting as a fully-enclosing electric "Faraday cage" around the entire inner portion of the ARPES analyzer as well as the target and target manipulator space, which reduces electronic noise leaking into the analyzer from outside the vacuum chamber. This also allows for a highly stable electronic reference point for the internal portions of the experimental system. Although this disclosure uses an ARPES analyzer as an exemplary charged particle analyzer, this disclosure is equally applicable to any charged particle analyzer system, an electrostatic analyzer, or any other type of electron analyzer utilizing a vacuum.

Figure 14:
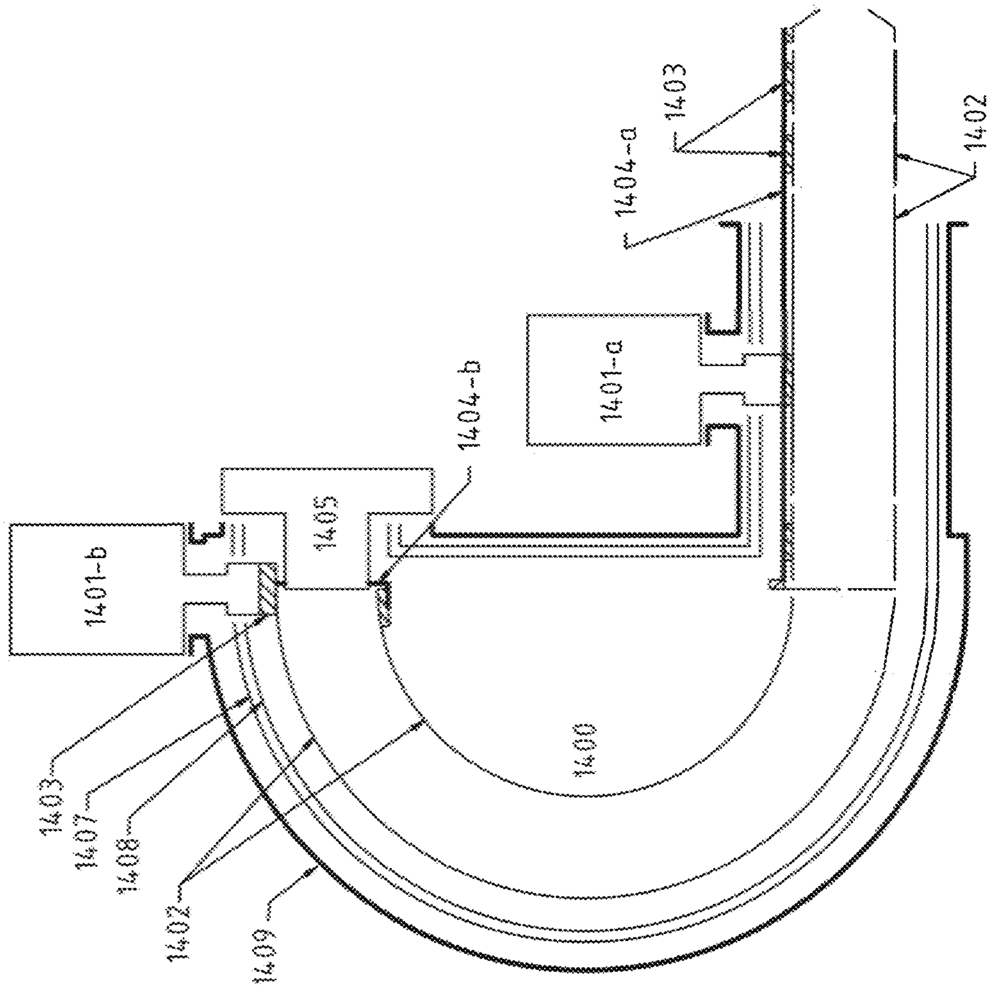
FIG. 14 shows a new concept for a cryogenically cooled hemispherical analyzer using a single-stage cryohead.
Figure 15:
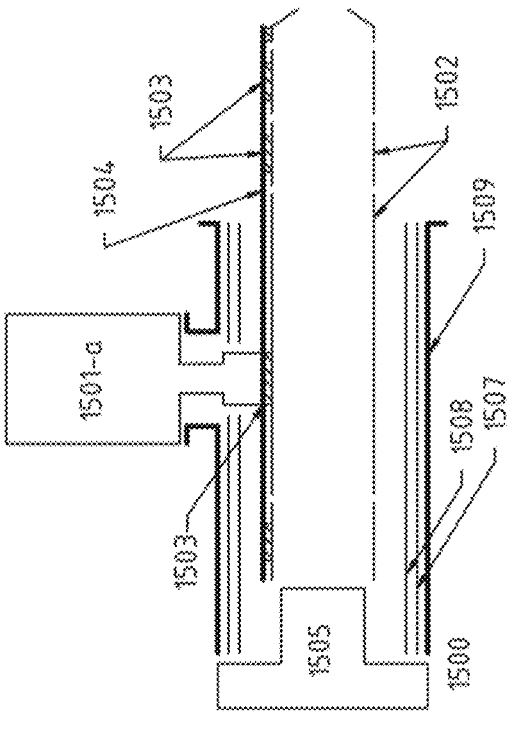
FIG. 15 shows a new concept for a cryogenically cooled TOF analyzer, using a single-stage cryohead.

FIG. 14 illustrates an embodiment of a cryogenically cooled hemispherical ARPES analyzer 1400 and FIG. 15 illustrates an embodiment of a cryogenically cooled TOF ARPES analyzer 1500. Both embodiments can include a first closed-cycle single-stage cryohead or cold head (e.g., cryohead 1401-*a* or cryohead 1501-*a*) coupled to one or more analyzer electrodes (e.g., analyzer electrodes 1402 or analyzer electrodes 1502). In some cases, this coupling can be made through an electrical-isolation component (e.g., electrical break 1403 or electrical break 1503) which may be composed of a block of sapphire or any other material that has a high thermal conductivity but low electrical conductivity. In some cases, ARPES analyzer 1400 and TOF analyzer 1500 may include a detector 1405 or detector 1505 at one end of the analyzer (i.e., the end opposite the target). In some cases, the ARPES analyzer or TOF analyzer may also include an outer metal shield 1407 or 1507, an inner metal shield 1408 or 1508, and a vacuum jacket 1409 or 1509.

At the same time, since the analyzer electrodes are isolated from each other, a thermally-conductive path (e.g., copper braid, thermal rope, thermal strap, thermal busbar 1404 or 1504, or any other rigid or flexible thermal path) can run between the cryohead 1401 or cryohead 1501 and the various electrodes 1402 or electrodes 1502 such that each electrode is cooled to the same temperature. In some examples, the thermally-conductive path can be coupled to each electrode through an electrical-isolation component (e.g., sapphire electrical break), just as the cold head is. Other setups can also be used to maintain thermal equilibrium between the various electrodes, but electrical isolation therebetween.

In some cases, for instance, when a single cold head is used, a thermally-conductive path may be needed between the two electrodes of the hemispherical portion of the analyzer. Optionally, in the hemispherical variation, a second cryohead 1401-*b* can be coupled to any or all of the electrodes in the hemispherical portion of the analyzer. A thermal busbar 1404-*b* can be used (as shown) to provide a thermal path between the second cryohead 1401-*b* and all of the electrodes.

Figure 16:
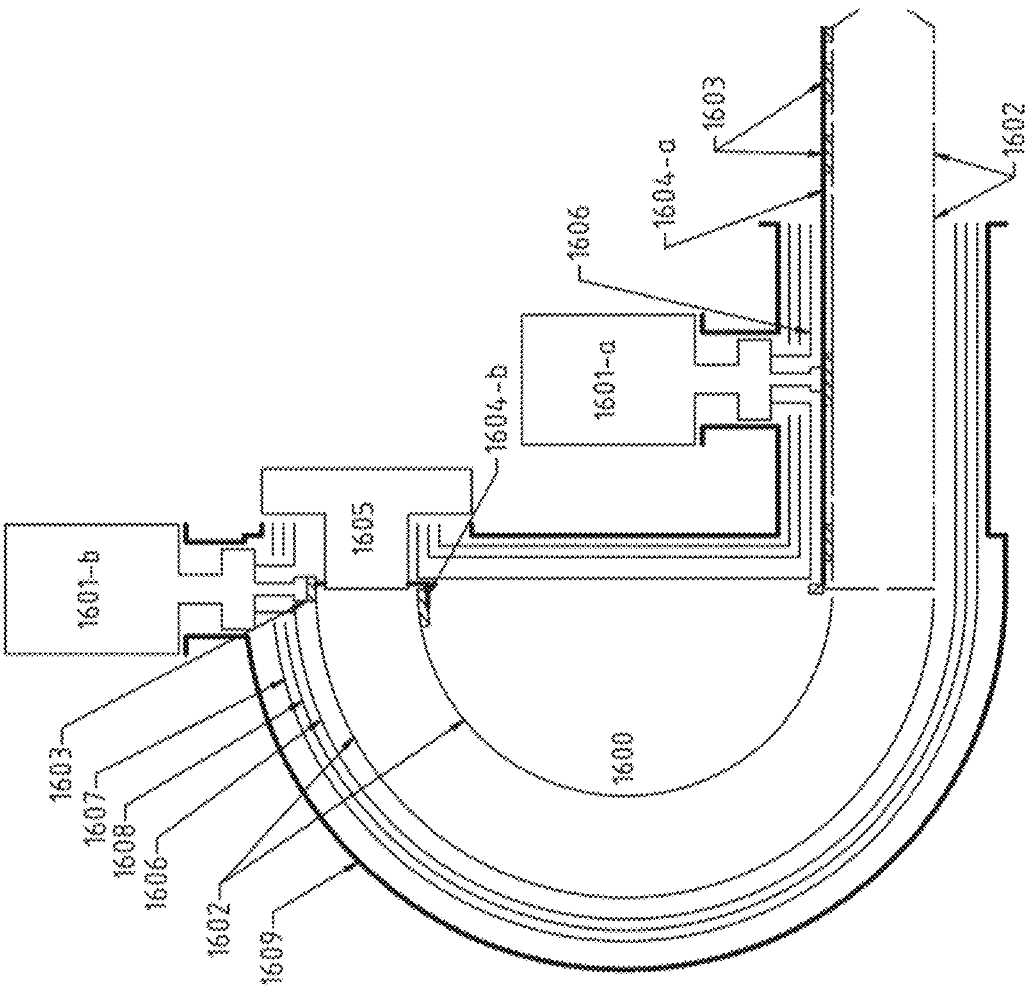
FIG. 16 shows another embodiment of a cryogenically cooled hemispherical analyzer using a two-stage cryohead.
Figure 17:
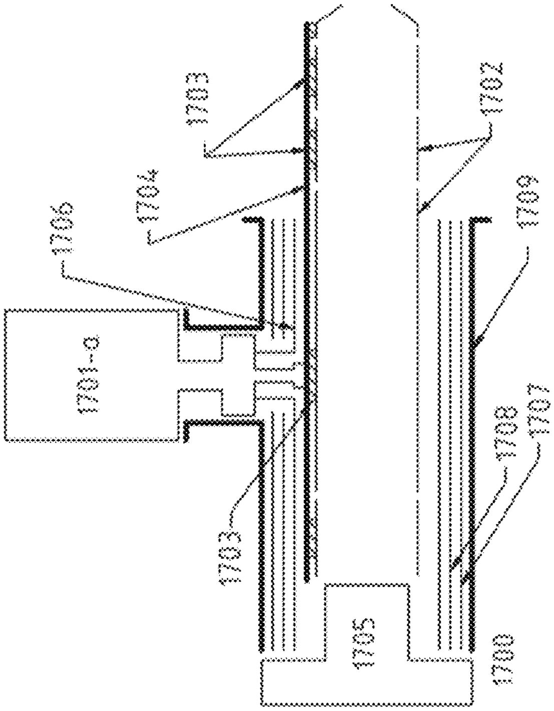
FIG. 17 shows another embodiment of a cryogenically cooled TOF analyzer using a two-stage cryohead.

FIG. 16 illustrates an embodiment of a cryogenically cooled hemispherical ARPES analyzer 1600 using a two-stage cryohead and a cooled radiation shield. FIG. 17 illustrates an embodiment of a cryogenically cooled TOF ARPES analyzer 1700 using a two-stage cryohead and a cooled radiation shield. ARPES analyzer 1600 and TOF ARPES analyzer 1700 may implement aspect(s) of ARPES analyzer 1400 and TOF ARPES analyzer 1500, as further described with reference to FIGS. 14 and 15, respectively.

The hemispherical ARPES analyzer of FIG. 16 may include one or more cryoheads 1601 (i.e., cryohead 1601-*a*, and cryohead 1601-*b*), one or more analyzer electrodes 1602, one or more electrical breaks 1603, one or more thermal busbars 1604 (i.e., thermal busbar 1604-*a*, and thermal busbar 1604-*b*), a detector 1605 at one end of the ARPES analyzer, an outer radiation shield 1606, an outer metal shield 1607, an inner metal shield 1608, and a vacuum jacket 1609.

The TOF ARPES analyzer of FIG. 17 may include a dual-stage cryohead 1701, one or more analyzer electrodes 1702, one or more electrical breaks 1703, a thermal busbar 1704, a detector 1705 at one end of the ARPES analyzer, an outer radiation shield 1706, an outer metal shield 1707, an inner metal shield 1708, and a vacuum jacket 1709.

In some cases, the inner and outer metal shields may be examples of high magnetic permeability shields, and may be composed of mu metal, supermalloy, supermumetal, molybdenum permalloy, or any other material with a relative magnetic permeability above a threshold (e.g., relative magnetic permeability>10,000). In some cases, magnetic permeability may be related to the ability of a material to support the formation of a magnetic field within itself (i.e., the degree of magnetization that the material obtains in response to an applied magnetic field). In some aspects, materials with a high magnetic permeability can attract magnetic fields and redirect magnetic energy through themselves, shielding sensitive equipment or experimental setups. In some cases, the high permeability shields deployed may allow for very low magnetic field levels (e.g., <0.5 μT, or <0.1 μT) within the analyzer, which is crucial for high resolution measurements of kinetic energies of charged particles, such as electrons. In some cases, electron emission from the sample (or target) may be facilitated via ultraviolet (UV) or laser excitation.

In some cases, the cooled outer radiation shield 1606 or outer radiation shield 1706 can be arranged inside both of the outer metal shield 1607 or outer metal shield 1707 and inner metal shield 1608 or inner metal shield 1708 and outside the electrodes 1602 or electrodes 1702. In these embodiments, the outer radiation shield 1606 or 1706 can be cooled to a first temperature (e.g., <77K) while the electrodes 1602 or 1702 can be cooled to a second temperature lower than the first temperature (e.g., <4K). In this way, the electrodes 1602 or 1702 act as the cooled inner shield seen for instance in FIGS. 3, 4, 7-11. In some cases, the analyzer electrodes 1602 or 1702 may acts as cryosorbtion pumps, since they are thermally coupled to the cold head. In some other cases, a sorbent material may be affixed to the electrodes 1602 or 1702 to increase their cold pumping surface area, as further described with reference to FIGS. 7 and 8.

In some cases, the two-stage cryohead 1601 or 1701 may allow for colder temperatures and better overall thermal and vacuum performance, as compared to a single stage cryohead 1401 or 1501, at a cost of increased complexity.

Figure 18:
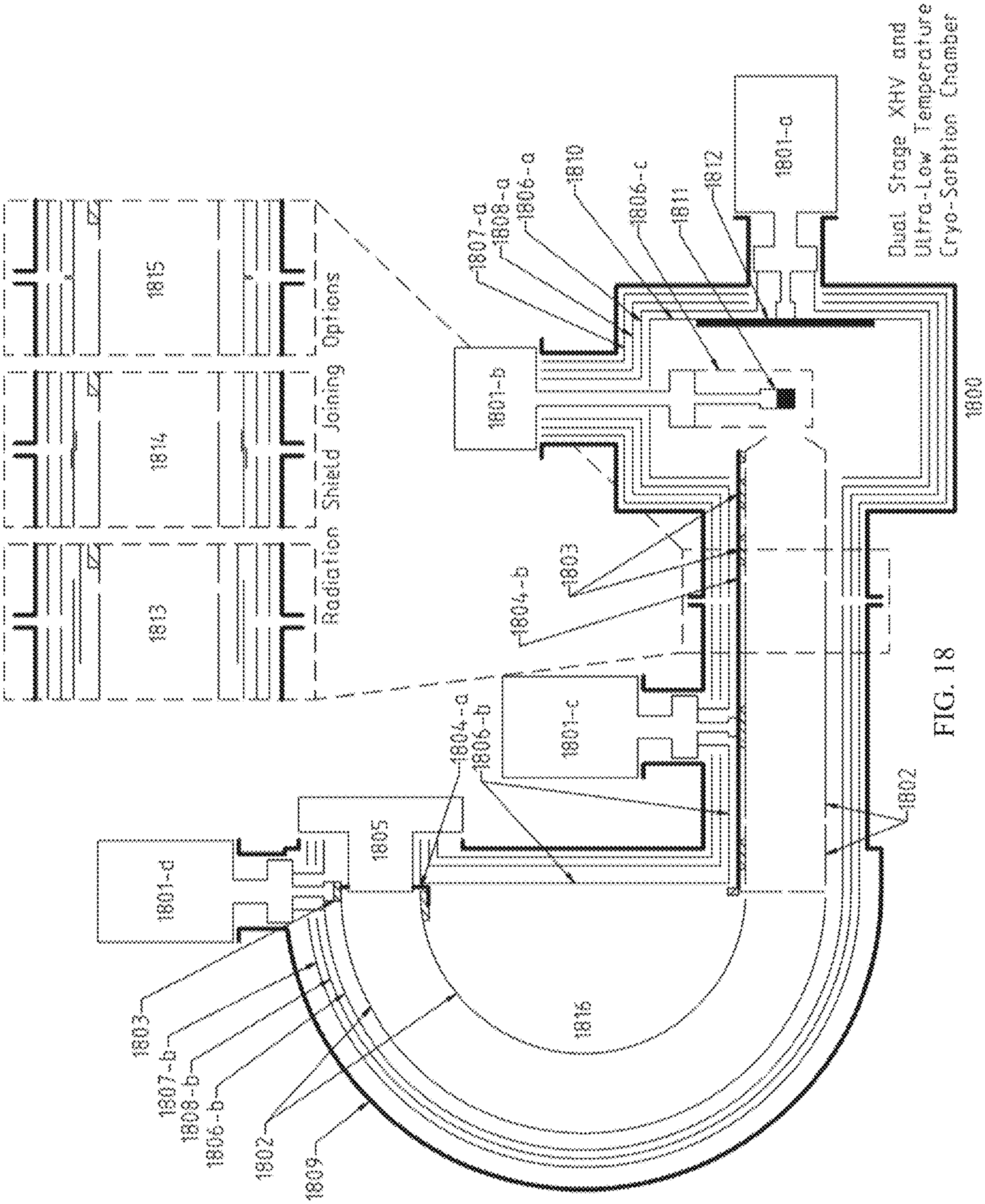
FIG. 18 shows a first embodiment of the 2-stage cooled hemispherical analyzer of FIG. 16 attached to a cryogenically cooled XHV vacuum chamber.

FIG. 18 illustrates the embodiment of FIG. 16 coupled to a cryogenically cooled extreme-high-vacuum (XHV) chamber 1800. A hemispherical ARPES analyzer 1816 coupled to the XHV chamber 1800 may include one or more cryoheads 1801 (i.e., cryohead 1801-*c*, and cryohead 1801-*d*), one or more analyzer electrodes 1802, one or more electrical breaks 1803, one or more thermal busbars 1804 (i.e., thermal busbar 1804-*a*, and thermal busbar 1804-*b*), a detector 1805 at one end of the ARPES analyzer, an outer radiation shield 1806-*b*, an outer metal shield 1807-*b*, an inner metal shield 1808-*b*, and a vacuum jacket 1809. Furthermore, the XHV chamber 1800 may include one or more cryoheads 1801 (i.e., cryohead 1801-*a*, and cryohead 1801-*b*), an outer metal shield 1807-*a*, an inner metal shield 1808-*a*, an outer radiation shield 1806-*a*, an inner radiation shield 1810, an optional radiation shield 1806-*c* surrounding the target (or sample 1811), and an optional sorbent material 1812 affixed to the inner radiation shield 1810. In some cases, the optional sorbent material affixed to the inner radiation shield may serve to optimize vacuum quality. In some cases, the inner and outer metal shields may be examples of the high magnetic permeability shields, as described with reference to FIG. 16. In some cases, the one or more analyzer electrodes 1802 from the ARPES analyzer may extend into the XHV chamber 1800.

In some cases, two-stage cryoheads such as cryohead 1801-*c* and 1801-*d* can be used to cool the outer radiation shield 1806-*b* to a first temperature and the electrodes 1802 to a second temperature lower than the first temperature. In some cases, in addition to guiding the charged particles towards the detector 1805, the electrodes 1802 may also behave as the cooled inner shield seen for instance in FIGS. 3, 4, 7-11.

Since the electrodes 1802 do not cover an entirety of the XHV chamber 1800, the second radiation shield 1810 can be arranged inside the outer radiation shield 1806-*a* of the XHV chamber 1800. As illustrated, the XHV chamber 1800 may include two-stage cryohead 1801-*a* that cools both the inner and outer radiation shields of the XHV chamber. Further, the XHV chamber may include a separate two-stage cryohead 1801-*b* for the sample 1811, where the first “warmer” stage of cryohead 1801-*b* is thermally coupled to the radiation shield 1806-*c* surrounding the sample, and the second “colder” stage is thermally coupled to the sample 1811.

In some cases, the outer radiation shield 1806-*a* of the XHV chamber 1800 may be thermally coupled to or overlap with the outer radiation shield 1806-*b* of the ARPES analyzer. For instance, three different detailed views of such a connection or overlap are shown in the inset of FIG. 18. These show an interleaving non-contacting joint 1813, a tight-fitting overlapping joint 1814, and a flanged joint 1815. Other joints and overlapping options are also possible so long as they achieve a reduction in radiation leakage at this joint.

Figure 19:
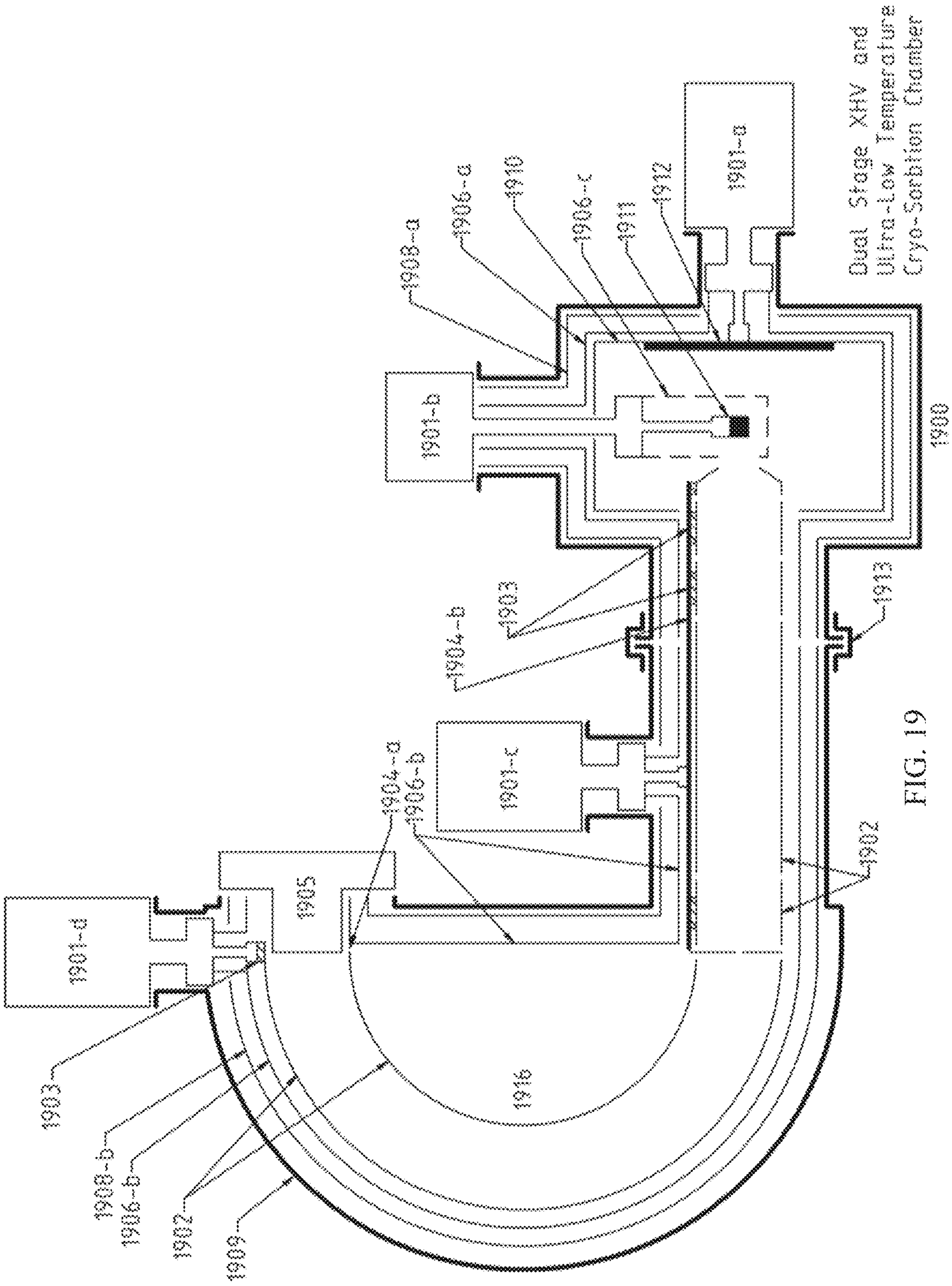
FIG. 19 shows a second embodiment of the 2-stage cooled hemispherical analyzer of FIG. 16 attached to a cryogenically cooled XHV vacuum chamber.

FIG. 19 illustrates a variation on FIG. 18 where one of the high permeability (e.g., Mu Metal) shields is removed and instead of a vacuum jacket (e.g., stainless steel), a high permeability vacuum jacket 1909 is used. In some cases, this may allow for a more compact system with fewer layers of shielding within the vacuum jacket 1909. In some cases, a hemispherical ARPES analyzer 1916 coupled to the XHV chamber 1900 may include: one or more cryoheads 1901 (i.e., cryohead 1901-*c*, and cryohead 1901-*d*), one or more analyzer electrodes 1902, one or more electrical breaks 1903, one or more thermal busbars 1904 (i.e., thermal busbar 1904-*a*, and thermal busbar 1904-*b*), a detector 1905 at one end of the ARPES analyzer, an outer radiation shield 1906-*b*, an inner metal shield 1908-*b*, and the high permeability vacuum jacket 1909.

Furthermore, the XHV chamber 1900 may include one or more cryoheads 1901 (i.e., cryohead 1901-*a*, and cryohead 1901-*b*), an inner metal shield 1908-*a*, an outer radiation shield 1906-*a*, an inner radiation shield 1910, an optional radiation shield 1906-*c* surrounding the target (or sample 1911), and an optional sorbent material 1912 affixed to the inner radiation shield 1910. In some cases, the optional sorbent material may serve to optimize vacuum quality in the XHV chamber 1900. In some cases, the inner metal shield may be an example of the high permeability shield, as described with reference to FIGS. 16 and 18. In some cases, the one or more analyzer electrodes 1902 from the ARPES analyzer 1916 may extended into the XHV chamber 1900.

In some case a high permeability coupler, such as a Mu Metal coupler 1913, may be used to bridge the high permeability (e.g., Mu Metal) gap between the ARPES analyzer 1916 and the XHV chamber 1900.

Figure 20:
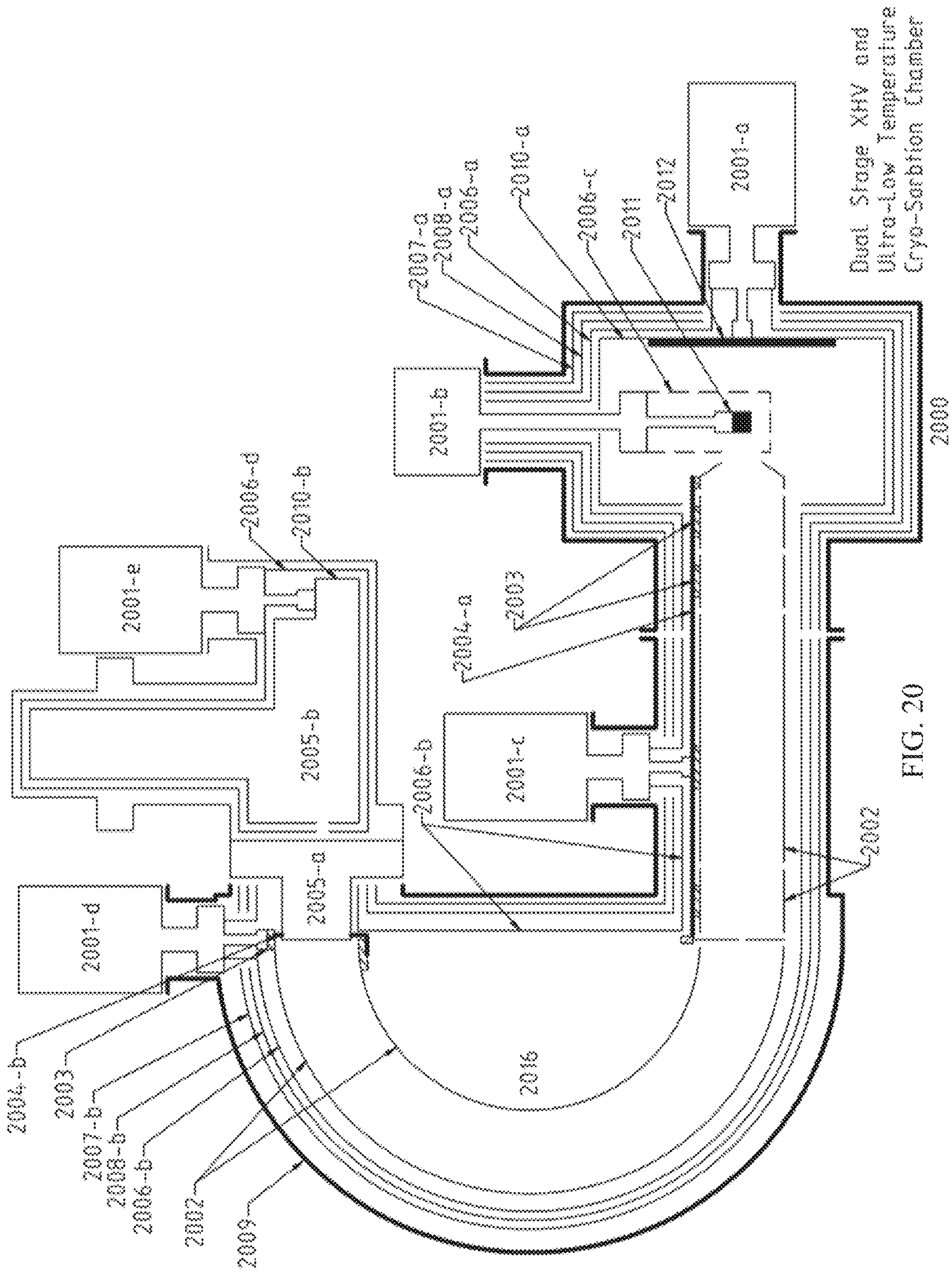
FIG. 20 shows an extension to the analyzer of FIG. 16 or 17 in which an extended detector is utilized

FIG. 20 illustrates another variation of FIG. 18 where an optional extended detector 2005-*b* is utilized, such as a 3D spin-resolved electron detector or 3D spin Very Low Energy Electron Diffraction (VLEED). In some cases, the ARPES analyzer and XHV chamber of FIG. 20 may implement aspects of FIGS. 7, 8, 14, 16, and/or 18. FIG. 20 illustrates a hemispherical ARPES analyzer 2016 coupled to a XHV chamber 2000, and may include one or more cryoheads 2001 (i.e., cryohead 2001-*c*, and cryohead 2001-*d*), one or more analyzer electrodes 2002, one or more electrical breaks 2003, one or more thermal busbars 2004 (i.e., thermal busbar 2004-*a*, and thermal busbar 2004-*b*), a detector 2005-*a* at one end of the ARPES analyzer 2016, the optional detector 2005-*b*, an outer radiation shield 2006-*b*, an outer metal shield 2007-*b*, an inner metal shield 2008-*b*, and a vacuum jacket 2009.

Furthermore, the XHV chamber 2000 may include one or more cryoheads 2001 (i.e., cryohead 2001-*a*, and cryohead 2001-*b*), an outer metal shield 2007-*a*, an inner metal shield 2008-*a*, an outer radiation shield 2006-*a*, an inner radiation shield 2010-*a*, an optional radiation shield 2006-*c* surrounding the target (or sample 2011), and an optional sorbent material 2012 affixed to the inner radiation shield 2010-*a*. In some cases, the optional sorbent material affixed to the inner radiation shield may serve to optimize vacuum quality. In some cases, the inner and outer metal shields may be examples of the high permeability shields, as described with reference to FIGS. 16 and 18. In some cases, the one or more analyzer electrodes 2002 from the ARPES analyzer 2016 may extended into the XHV chamber 2000.

In some cases, additional cooling may be added to this system so as to have XHV conditions in the optional extended detector 2005-*b*. In particular, the optional extended detector 2005-*b* may include an outer radiation shield 2006-*d* cooled by either a cryohead 2001-*e* that is part of the extended detector, or by the optional additional cryohead 2001-*d* coupled to the hemispherical ARPES analyzer 2016. In some cases, the optional extended detector 2005-*b* may also include an inner radiation shield 2010-*b* cooled by the extended detector's cryohead 2001-*e*.

It should be noted that throughout this disclosure, the analyzer electrodes (e.g., analyzer electrodes 1402, 1502, 1602, 1702, 1802, 1902, or 2002) with slits are also thermally coupled to a cryohead and may be cooled to <4K, or the same temperature as the other electrodes, also making them effective radiation shields for black-body radiation traveling within the electrodes towards the target (or sample).

Figure 21:
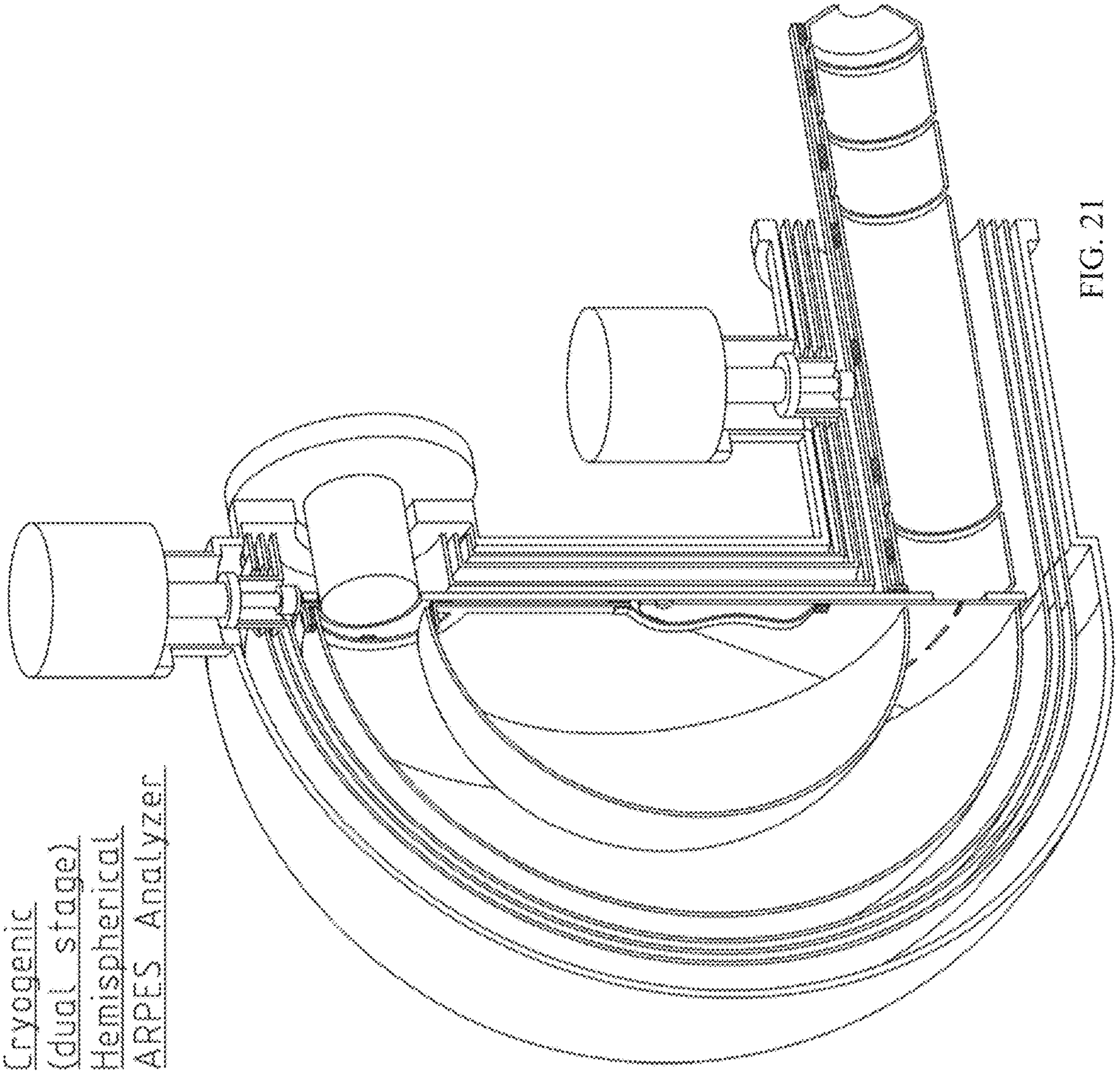
FIG. 21 is a perspective view of a cross section of the analyzer in FIG. 16.

FIG. 21 is a perspective view of a cross section of the analyzer in FIG. 14.

Figure 22:
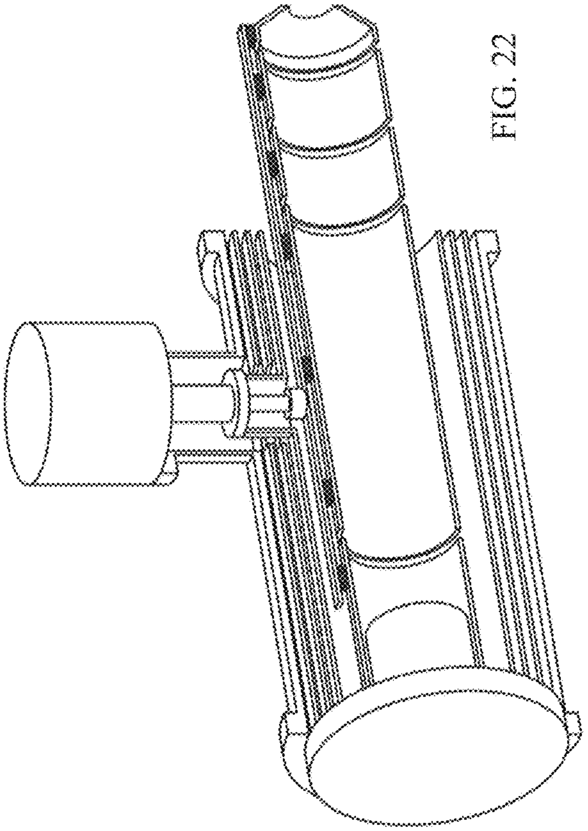
FIG. 22 is a perspective view of a cross section of the analyzer in FIG. 17.

FIG. 22 is a perspective view of a cross section of the analyzer in FIG. 15.

Figure 23:
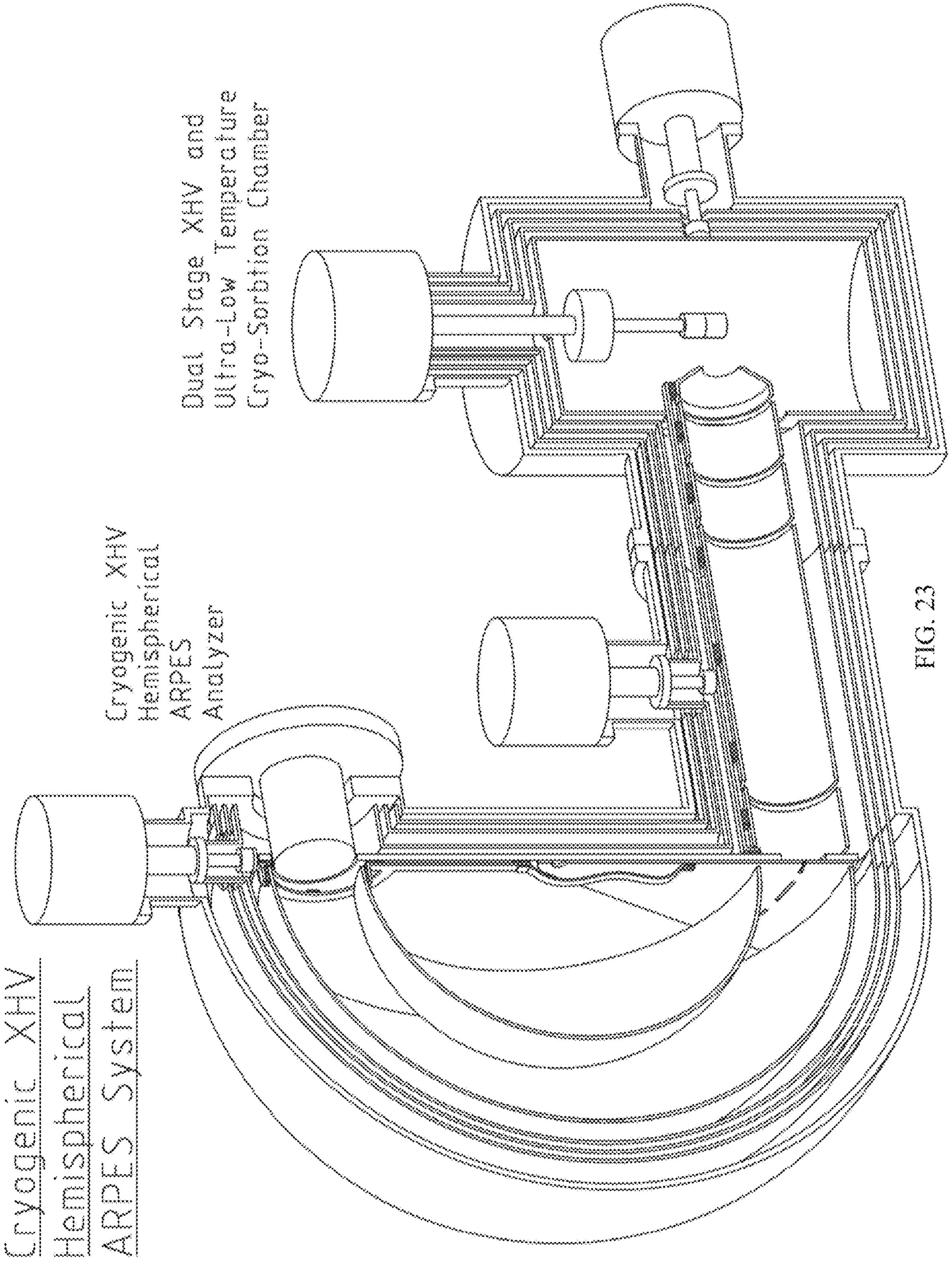
FIG. 23 is a perspective view of a cross section of the analyzer and in FIG. 18.
Figure 24:
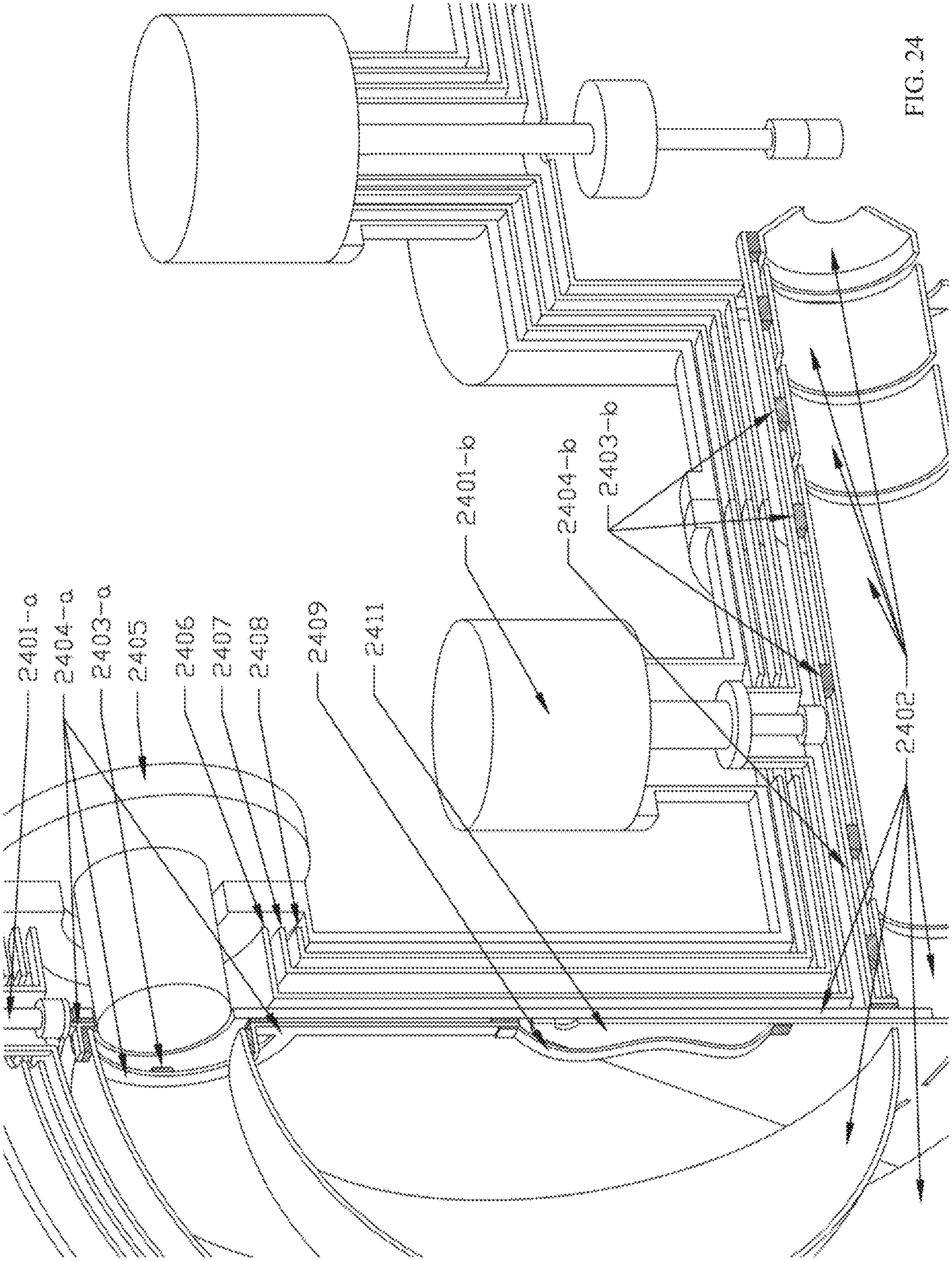
FIG. 24 is a detailed view of the analyzer in FIG. 23 showing an embodiment of internal routing of the thermal busbar and electrical breaks.

FIG. 23 is a perspective view of a cross section of the ARPES system in FIG. 18, and FIG. 24 provides further details of this embodiment. In particular, FIG. 24 shows an embodiment of internal routing of the thermal busbar and electrical breaks. The internal rigid and flexible busbars can be routed in many different ways to accommodate a variety of cold head configurations and numbers.

In some cases, the ARPES system in FIG. 24 may include a dual stage closed cycle cryohead 2401-*a*, one or more analyzer electrodes 2402, a thermal busbar 2404-*a*, one or more electrical isolators 2403 (e.g., electrical isolator 2403-*a*) between the thermal busbar 2404-*a* and analyzer electrodes 2402, a detector 2405, an outer radiation shield 2406, an inner radiation shield 2410, an outer metal shield 2407 (e.g., Mu Metal), an inner metal shield 2408 (e.g., Mu Metal), one or more flexible thermal busbars 2409 (e.g., copper braid, or rope), and a slit carousel 2411. Furthermore, the linear section of the ARPES system, i.e., closer to the target or sample, may comprise: a second closed-cycle cryohead 2401-*b*, a thermal busbar 2404-*b*, and one or more electrical isolators 2403 (e.g., electrical isolators 2403-*b*). In some cases, the electrical isolators 2403 may be composed of a thermally conductive, and electrically isolating material, such as Sapphire.

Figure 25:
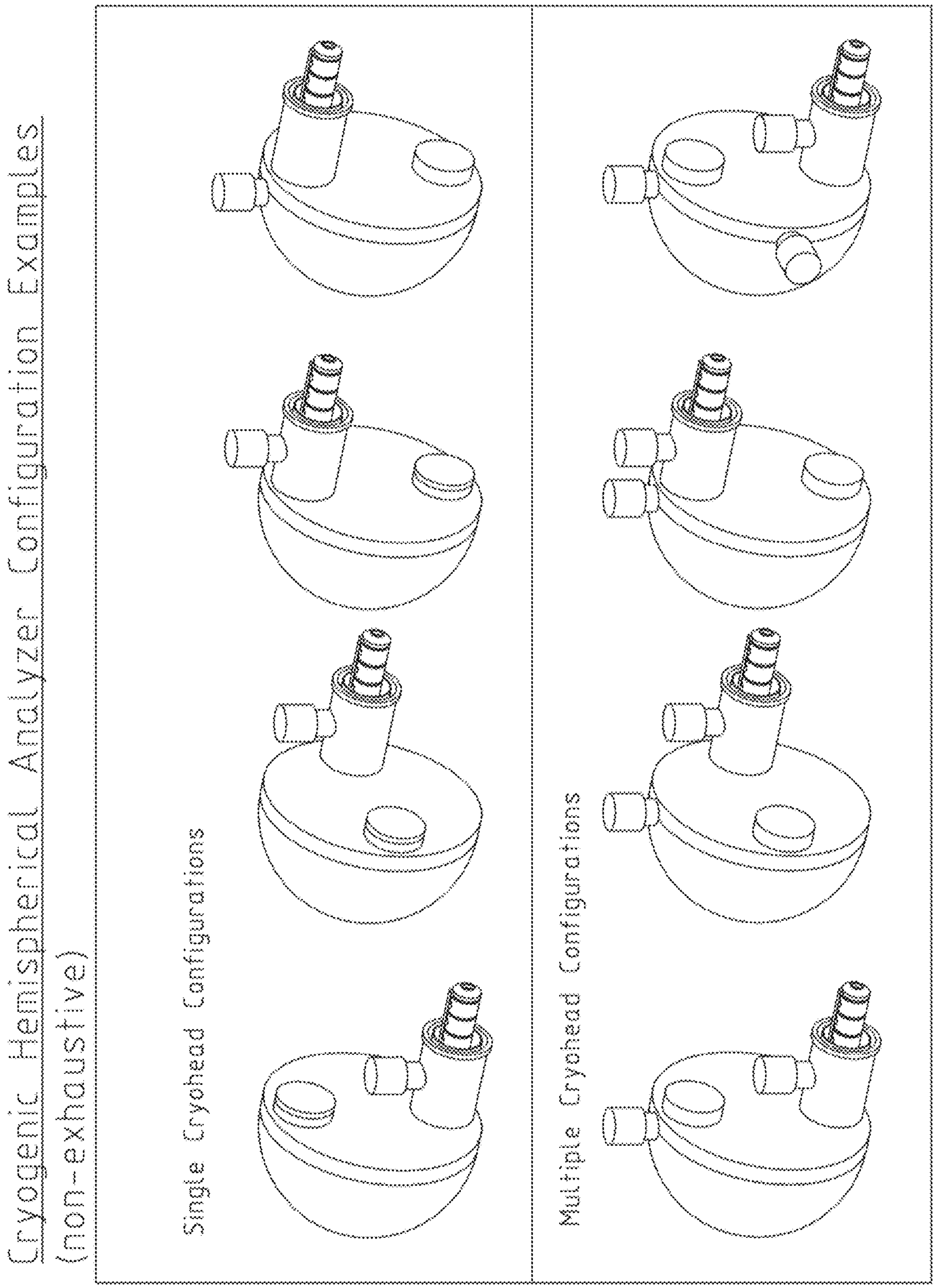
FIG. 25 shows various examples of analyzer and cryohead configurations with both single and multiple cryoheads. From this it can be seen that the disclosure intends to cover a wide variety of experimental setups.

FIG. 25 shows various examples of hemispherical ARPES analyzer and cryohead configurations with both single and multiple cryoheads. From this it can be seen that the disclosure intends to cover a wide variety of experimental setups.

Figure 26:
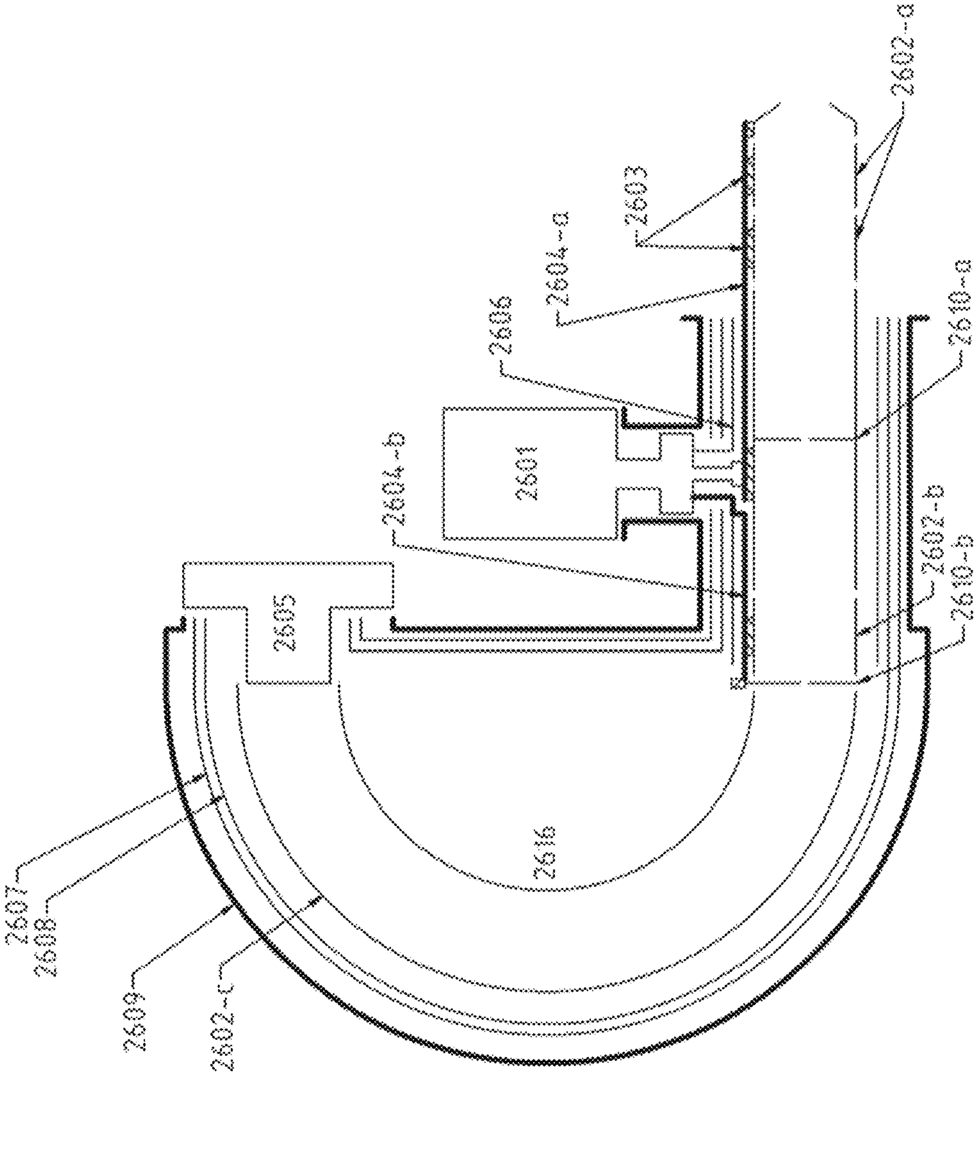
FIG. 26 is a 2-stage cooled hemispherical analyzer having a first stage thermally coupled to a first set of one or more electrodes and a second stage thermally coupled to a second set of one or more electrodes.
Figure 27:
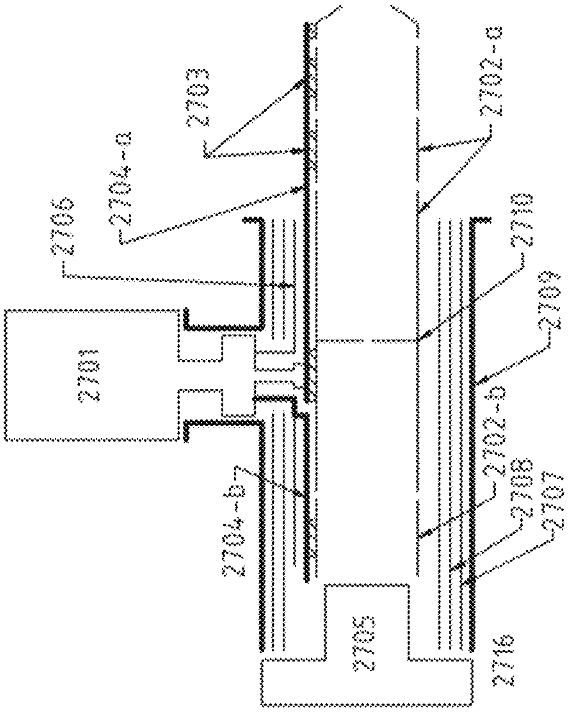
FIG. 27 is a 2-stage cooled TOF analyzer having a first stage thermally coupled to a first set of one or more electrodes and a second stage thermally coupled to a second set of one or more electrodes.

FIG. 26 illustrates a 2-stage cooled hemispherical analyzer 2616, while FIG. 27 illustrates a 2-stage cooled TOF analyzer 2716. A primary consideration in such analyzers is to minimize radiation and heat at the sample. This variation recognizes that the entire analyzer does not need to be maintained at minimum temperatures in order to achieve nearly the same result as some of the embodiments shown earlier. Accordingly, this variation seeks to reduce the number of cryoheads as well as radiation shields while still maintaining XHV conditions at the sample. To do this, a single two-stage cryohead 2601 or cryohead 2701 is used where the cooler second stage (e.g., 3K) is thermally coupled to one or more analyzer electrodes 2602-*a* or electrodes 2702-*a* in the linear (straight) portion of the analyzer, as well as an electrode with an intermediate slit 2610-*a* or 2710 within this linear section. A second stage thermal busbar 2604-*a* or other thermally conductive path can thermally couple the second stage of the cryohead 2601 or 2701 to electrodes 2602-*a* or 2702-*a* in the linear section.

Toward the detector 2605 or detector 2705, the first stage (e.g., 45K) of the two-stage cryohead can thermally couple to one or more electrodes 2602-*b* or 2702-*b* that are on the detector-side of the electrodes with a slit 2610-*a* or 2710. This connection may be made via a thermal busbar 2604-*b* or 2704-*b*. In other words, the second colder stage of the cryohead can cool a first set of one or more analyzer electrodes (i.e., analyzer electrodes 2602-*a* or 2702-*a*) closer to the sample to a first temperature, and the first stage of the cryohead can cool a second set of one or more analyzer electrodes (i.e., analyzer electrodes 2602-*b* or 2702-*b*) closer to the detector 2605 or 2705 to a second temperature higher than the first temperature. It should be noted that the first stage of the cryohead is thermally coupled to both the second set of one or more electrodes 2602-*b* or 2702-*b* and also an outer radiation shield 2606 or outer radiation shield 2706.

This variation does not need to cool the electrodes 2602-*c* in the hemispherical portion of the analyzer since an electrode (or radiation shield) with slit 2610-*b* blocks most of the 300K radiation from the hemispherical portion as well as pumps most particles attempting to enter the linear portion from the hemispherical portion.

Said another way, as seen from the sample, the second colder stage of the cryohead can cool as far as the electrode with slit 2610-*a* or 2710 in order for nearly all black-body solid angle to be blocked at the sample. The first stage (i.e., warmer stage) of the cryohead can again cool the outer radiation shield 2606 or 2706 as in previous embodiments, but here also cool electrodes 2602-*b* or 2702-*b* between the electrode with slit 2610-*a* or 2710 and either: the electrode (or radiation shield) with slit 2610-*b* (hemispherical version); or the detector (time-of-flight version). Where the second radiation shield with slit 2610-*b* is implemented, the first stage can also thermally couple to this shield. This configuration is almost as effective as cooling every element because the only 300K radiation and gas load that hits the sample must pass through two narrow slits spaced far apart so the solid angle is extremely low (in the hemispherical variation) and must pass through one narrow slit spaced far from the sample in the TOF variation, so the solid angle is also very low.

It should be noted that the location of the thermal path between the first stage of the cryohead and the second set of one or more electrodes 2602-*b* or 2702-*b* closer to the detector, or between the second radiation shield with slit 2610-*b* and the second set of one or more electrodes 2602-*b* or 2702-*b* can vary and does not have to comport with the illustrated locations in FIG. 26 or 27.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. An ultra-high vacuum (UHV) or extreme-high vacuum (XHV) system comprising:
- a vacuum chamber;
- a target within the vacuum chamber;
- two or more overlapping radiation shields arranged within an inner vacuum space of a vacuum chamber, wherein the two or more overlapping radiation shields surround at least a portion of the target;
- a first cooling element unit thermally coupled to a first radiation shield of the two or more overlapping radiation shields, wherein the first cooling element unit is configured to reduce the first radiation shield's temperature to at least <100K;
- a second cooling element unit thermally coupled to a second radiation shield of the two or more overlapping radiation shields, wherein the second cooling element unit is configured to reduce the second radiation shield's temperature to at least <25K; and
- a third cooling element unit thermally coupled to the target, the third cooling element unit thermally isolated from both the first radiation shield and the second radiation shield, wherein the third cooling element unit is configured to reduce the target's temperature to at least <4K.

2. The system of claim 1, wherein the first cooling element unit and the second cooling element unit each comprise one or more cold heads, or two stages of a single cold head.

3. The system of claim 1, wherein the two or more radiation shields, individually or in combination, cover at least 90% $4\pi$ steradians around the target.

4. The system of claim 1, wherein the second radiation shield comprises:
- a sorbent material affixed to an inner surface of the second radiation shield, wherein the sorbent material is configured to increase an effective surface area of the second radiation shield.

5. The system of claim 4, wherein the second cooling element unit is configured to reduce the second radiation shield's temperature to at least <15K.

6. The system of claim 1, wherein the second cooling element unit is switched on a duration of time after the first cooling element unit is switched on, wherein the duration of time is based at least in part on a partial pressure of one or more gases in the vacuum chamber.

7. The system of claim 1, wherein the third cooling element unit is a dual stage closed-cycle cold head, and wherein a first cold head of the third cooling element unit is thermally coupled to a third radiation shield surrounding the target and a second cold head of the third cooling element unit is thermally coupled to the target.

8. The system of claim 7, wherein the first cold head and the second cold head are switched on at different times.

9. The system of claim 1, further comprising:
- one or more high permeability shields arranged within the inner vacuum space of the vacuum chamber, wherein the one or more high permeability shields surround the first and second radiation shield.

10. A method for ultra-high vacuum (UHV) or extreme high vacuum (XHV), comprising:
- providing two or more overlapping radiation shields within an inner vacuum space of a vacuum chamber, the two or more overlapping radiation shields covering at least 90% $4\pi$ steradians around a target;
- thermally coupling a first cooling element unit to a first of the two or more overlapping radiation shields;
- thermally coupling a second cooling element unit to a second of the two or more overlapping radiation shields;
- thermally coupling a third cooling element unit to the target, the third cooling element unit thermally isolated from the first and second radiation shields;
- cooling the first radiation shield to <100K;
- cooling the second radiation shield to <25K;
- cooling the target to <4K; and
- interacting an elongated tool with the target through one or more apertures in the first and second radiation shields, while maintaining the at least 90% $4\pi$ steradians coverage around the target.

11. The method of claim 10, wherein the first cooling element unit and the second cooling element unit each comprise one or more cold heads, or two stages of a single cold head.

12. The method of claim 10, wherein the second radiation shield comprises a sorbent material affixed to an inner surface of the second radiation shield.

13. The method of claim 10, wherein the second radiation shield is cooled to <15K.

14. The method of claim 10, wherein the first and second cooling element units are switched on at different times.

15. An apparatus for ultra-high vacuum (UHV) or extreme high vacuum (XHV), comprising:

two or more overlapping radiation shields within an inner vacuum space of a vacuum chamber, wherein the two or more overlapping radiation shields surround at least a portion of a target thereby blocking a majority of blackbody radiation from reaching the target;

means for reducing a temperature of the first radiation shield to <100K;

means for reducing a temperature of the second radiation shield to <25K;

means for reducing a temperature of the target to <4K, and wherein the means for reducing the temperature of the target is thermally isolated from both of the means for reducing the temperature of the first radiation shield and the means for reducing the temperature of the second radiation shield; and means for interacting with the target via one or more apertures in the first and second radiation shields.

16. The apparatus of claim 15, wherein the second radiation shield comprises a sorbent material on an inner surface of the second radiation shield.

17. The apparatus of claim 15, wherein the means for reducing the temperature of the second radiation shield is configured to reduce the temperature of the second radiation shield to <15K.

18. The apparatus of claim 15, wherein the means for reducing the temperature of the first radiation shield is configured to be turned on before turning on the means for reducing the temperature of the second radiation shield.

19. The apparatus of claim 15, wherein the apertures are shaped to maintain at least 90% 4π steradians of radiation coverage around the target.

* * * * *